(12) United States Patent
Walker et al.

(10) Patent No.: US 7,899,710 B1
(45) Date of Patent: Mar. 1, 2011

(54) DETERMINATION AND PRESENTATION OF PACKAGE PRICING OFFERS IN RESPONSE TO CUSTOMER INTEREST IN A PRODUCT

(75) Inventors: Jayu S. Walker, Ridgefield, CT (US); Magdalena Mik, Greenwich, CT (US); John B. Dickerson, New Canaan, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/360,422

(22) Filed: Jul. 23, 1999

Related U.S. Application Data

(63) Continuation-in-part of application No. 09/085,424, filed on May 27, 1998, now Pat. No. 6,138,105.

(51) Int. Cl.
 *G06Q 30/00* (2006.01)
(52) U.S. Cl. .............................. 705/26; 705/37
(58) Field of Classification Search .................... 705/26, 705/27, 10, 37
 See application file for complete search history.

(56) References Cited

U.S. PATENT DOCUMENTS

| | | | |
|---|---|---|---|
| 3,573,747 A | 4/1971 | Adams et al. | 340/172.5 |
| 4,008,792 A | 2/1977 | Levasseur et al. | 194/1 N |
| 4,108,361 A | 8/1978 | Krause | 235/375 |
| 4,237,537 A | 12/1980 | Pitches et al. | 364/465 |
| 4,245,730 A | 1/1981 | Bachmann et al. | 194/1 A |
| 4,282,575 A | 8/1981 | Hoskinson et al. | 364/479 |

(Continued)

FOREIGN PATENT DOCUMENTS

EP 0 085546 A2 1/1983

(Continued)

OTHER PUBLICATIONS

Carol Tice, Web Ordering May alter Role of Distributors, Jun. 22, 1998, National Home Center News, downloaded from the Internet on Jul. 1, 2003, 6 pages.*

(Continued)

*Primary Examiner* — James Zurita
(74) *Attorney, Agent, or Firm* — Fincham Downs LLC; Carson C. K. Fincham

(57) ABSTRACT

A system and method for determination and presentation of package offers. A package offer is an offer for sale by a retailer of a package of products at a package price. A retailer may offer products for sale in an on-line retail environment or in a physical retail environment. A determination is made that a primary product is of interest to a customer. This determination may involve detecting and interpreting input signals transmitted from a customer device. In response to detecting that the primary product is of interest to the customer, a package is determined that may comprise the primary product and at least one secondary product. A package may be determined by accessing a database to locate a pre-determined package or to select the secondary products ad hoc. A package price is determined that is less than the sum of the corresponding retail prices of the primary product and secondary products in the package. A package price may be based on a profit margin of the primary product and/or a profit margin of at least one of the secondary products. A package offer for the sale of the package at the package price is then presented to the customer. The customer may indicate an acceptance of the package offer and authorize a financial account to be charged for the amount of the package price. The package products may be shipped to the customer or may be picked up at a retail establishment.

112 Claims, 21 Drawing Sheets

U.S. PATENT DOCUMENTS

| | | | |
|---|---|---|---|
| 4,323,770 A | 4/1982 | Dieulot et al. | 235/375 |
| 4,412,292 A | 10/1983 | Sedam et al. | 364/479 |
| 4,494,197 A | 1/1985 | Troy et al. | 364/412 |
| 4,498,570 A | 2/1985 | King et al. | 194/1 N |
| 4,500,880 A | 2/1985 | Gomersall | 340/825.35 |
| 4,593,361 A | 6/1986 | Otten | 364/479 |
| 4,654,800 A | 3/1987 | Hayashi et al. | 364/479 |
| 4,669,730 A | 6/1987 | Small | 273/138 A |
| 4,677,553 A | 6/1987 | Roberts et al. | 364/412 |
| 4,679,150 A | 7/1987 | Hayashi et al. | 364/479 |
| 4,689,742 A | 8/1987 | Troy et al. | 364/412 |
| 4,723,212 A | 2/1988 | Mindrum et al. | 364/401 |
| 4,760,247 A | 7/1988 | Keane et al. | 235/454 |
| 4,766,548 A | 8/1988 | Cedrone et al. | 364/479 |
| 4,815,741 A | 3/1989 | Small | 273/138 A |
| 4,825,045 A | 4/1989 | Humble | 235/383 |
| 4,834,231 A | 5/1989 | Awane et al. | 194/206 |
| 4,839,507 A | 6/1989 | May | 235/381 |
| 4,854,590 A | 8/1989 | Joliff et al. | 273/138 A |
| 4,859,838 A | 8/1989 | Okiharu | 235/383 |
| 4,876,592 A | 10/1989 | Von Kohorn | 358/84 |
| 4,882,473 A | 11/1989 | Bergeron et al. | 235/380 |
| 4,902,880 A | 2/1990 | Garczynski et al. | 235/375 |
| 4,906,828 A | 3/1990 | Halpern | 235/379 |
| 4,908,761 A | 3/1990 | Tai | 364/401 |
| 4,910,672 A | 3/1990 | Off et al. | |
| 4,922,522 A | 5/1990 | Scanlon | 379/95 |
| 4,937,853 A | 6/1990 | Brule et al. | 379/96 |
| 4,973,952 A | 11/1990 | Malec et al. | 340/825.35 |
| 4,982,337 A | 1/1991 | Burr et al. | 364/479 |
| 4,993,714 A | 2/1991 | Golightly | 273/138 A |
| 4,996,642 A | 2/1991 | Hey | |
| 5,025,372 A | 6/1991 | Burton et al. | 364/406 |
| 5,056,019 A | 10/1991 | Schultz et al. | 364/405 |
| 5,091,713 A | 2/1992 | Horne et al. | 340/541 |
| 5,119,295 A | 6/1992 | Kapur | 364/412 |
| 5,128,862 A | 7/1992 | Mueller | 364/405 |
| 5,132,914 A | 7/1992 | Cahlander et al. | 364/478 |
| 5,172,328 A | 12/1992 | Cahlander et al. | |
| 5,173,851 A | 12/1992 | Off et al. | |
| 5,177,342 A | 1/1993 | Adams | |
| 5,192,854 A | 3/1993 | Counts | |
| 5,201,010 A | 4/1993 | Deaton et al. | |
| 5,216,595 A | 6/1993 | Protheroe | |
| 5,223,698 A | 6/1993 | kapur | |
| 5,231,569 A | 7/1993 | Myatt et al. | |
| 5,239,165 A | 8/1993 | Novak | |
| 5,243,515 A | 9/1993 | Lee | |
| 5,245,533 A | 9/1993 | Marshall | |
| 5,250,789 A | 10/1993 | Johnsen | 235/383 |
| 5,256,863 A | 10/1993 | Ferguson et al. | |
| 5,257,179 A | 10/1993 | DeMar | 364/410 |
| 5,262,941 A | 11/1993 | Saladin et al. | |
| 5,267,452 A | 12/1993 | Zinsmeyer et al. | 62/505 |
| 5,274,547 A | 12/1993 | Zoffel et al. | |
| 5,283,731 A | 2/1994 | Lalonde et al. | |
| 5,287,268 A | 2/1994 | McCarthy | |
| 5,297,026 A | 3/1994 | Hoffman | 364/408 |
| 5,297,031 A | 3/1994 | Gutterman et al. | |
| 5,302,811 A | 4/1994 | Fukatsu | |
| 5,305,195 A | 4/1994 | Murphy | 364/401 |
| 5,309,355 A | 5/1994 | Lockwood | |
| 5,339,250 A | 8/1994 | Durbin | 364/479 |
| 5,353,218 A | 10/1994 | De Lapa et al. | |
| 5,353,219 A | 10/1994 | Mueller et al. | 364/405 |
| 5,367,452 A | 11/1994 | Gallery et al. | 364/401 |
| 5,371,796 A | 12/1994 | Avarne | 380/23 |
| 5,380,991 A | 1/1995 | Valencia et al. | |
| RE34,915 E | 4/1995 | Nichtberger et al. | |
| 5,420,606 A | 5/1995 | Begum et al. | |
| 5,434,394 A | 7/1995 | Roach et al. | |
| 5,450,938 A | 9/1995 | Rademacher | 194/206 |
| 5,452,344 A | 9/1995 | Larson | 379/107 |
| 5,459,306 A | 10/1995 | Stein et al. | |
| 5,481,094 A | 1/1996 | Suda | |
| 5,504,475 A | 4/1996 | Houdou et al. | |
| 5,510,979 A | 4/1996 | Moderi et al. | |
| 5,511,646 A | 4/1996 | Maldanis et al. | 194/217 |
| 5,521,364 A | 5/1996 | Kimura et al. | |
| 5,539,189 A | 7/1996 | Wilson | 235/379 |
| 5,564,546 A | 10/1996 | Molbak et al. | 194/216 |
| 5,572,653 A | 11/1996 | DeTemple et al. | |
| 5,581,064 A | 12/1996 | Riley et al. | |
| 5,592,375 A | 1/1997 | Salmon et al. | |
| 5,592,376 A | 1/1997 | Hodroff | |
| 5,592,378 A | 1/1997 | Cameron et al. | 395/227 |
| 5,602,377 A | 2/1997 | Beller et al. | |
| 5,608,643 A | 3/1997 | Wichter et al. | 364/479.14 |
| 5,611,052 A | 3/1997 | Dykstra et al. | |
| 5,612,868 A | 3/1997 | Off et al. | |
| 5,613,620 A | 3/1997 | Center et al. | 221/133 |
| 5,615,269 A | 3/1997 | Micali | |
| 5,619,558 A | 4/1997 | Jheeta | 379/90 |
| 5,620,079 A | 4/1997 | Molbak | |
| 5,621,201 A | 4/1997 | Langhans et al. | |
| 5,621,640 A | 4/1997 | Burke | |
| 5,621,812 A | 4/1997 | Deaton et al. | 382/100 |
| 5,632,010 A | 5/1997 | Briechle et al. | |
| 5,638,457 A | 6/1997 | Deaton et al. | |
| 5,642,484 A | 6/1997 | Harrison, III et al. | |
| 5,642,485 A | 6/1997 | Deaton et al. | |
| 5,644,723 A | 7/1997 | Deaton et al. | |
| 5,649,114 A | 7/1997 | Deaton et al. | |
| 5,652,421 A | 7/1997 | Veeneman et al. | |
| 5,655,007 A | 8/1997 | McAllister | |
| 5,664,115 A | 9/1997 | Fraser | 705/37 |
| 5,665,953 A | 9/1997 | Mazzamuto et al. | 235/383 |
| 5,671,276 A | 9/1997 | Eyer et al. | |
| 5,687,322 A | 11/1997 | Deaton et al. | |
| 5,701,252 A | 12/1997 | Facchin et al. | |
| 5,710,886 A | 1/1998 | Christensen et al. | |
| 5,710,887 A * | 1/1998 | Chelliah et al. | 395/226 |
| 5,724,886 A | 3/1998 | Ewald et al. | 99/374 |
| 5,732,398 A | 3/1998 | Tagawa | |
| 5,734,150 A | 3/1998 | Brown et al. | |
| 5,749,081 A | 5/1998 | Whitels | |
| 5,774,868 A | 6/1998 | Cragun et al. | |
| 5,774,869 A | 6/1998 | Toader | |
| 5,791,991 A | 8/1998 | Small | |
| 5,806,045 A | 9/1998 | Biorge et al. | |
| 5,809,144 A | 9/1998 | Sirbu et al. | |
| 5,816,918 A | 10/1998 | Kelly et al. | |
| 5,822,735 A | 10/1998 | De Lapa et al. | |
| 5,822,736 A | 10/1998 | Hartman et al. | |
| 5,832,457 A | 11/1998 | O'Brien et al. | |
| 5,832,496 A | 11/1998 | Anand et al. | |
| 5,835,087 A | 11/1998 | Herz et al. | |
| 5,842,178 A | 11/1998 | Giovannoli | |
| 5,844,808 A | 12/1998 | Konsmo et al. | |
| 5,845,259 A | 12/1998 | West et al. | |
| 5,848,396 A | 12/1998 | Gerace | |
| 5,855,007 A | 12/1998 | Jovicic et al. | |
| 5,857,175 A | 1/1999 | Day et al. | |
| 5,859,414 A | 1/1999 | Grimes et al. | |
| 5,864,822 A | 1/1999 | Baker, III | 705/14 |
| 5,873,069 A | 2/1999 | Reuhl et al. | |
| 5,878,401 A | 3/1999 | Joseph | |
| 5,890,718 A | 4/1999 | Byon | |
| 5,897,622 A * | 4/1999 | Blinn et al. | 705/26 |
| 5,918,211 A | 6/1999 | Sloane | 705/16 |
| 5,918,213 A * | 6/1999 | Bernard et al. | 705/26 |
| 5,930,145 A | 7/1999 | Yuyama et al. | |
| 5,933,813 A * | 8/1999 | Teicher et al. | 705/26 |
| 5,946,665 A | 8/1999 | Suzuki et al. | |
| 5,948,040 A * | 9/1999 | DeLorme et al. | 701/201 |
| 5,970,469 A | 10/1999 | Scroggie et al. | 705/14 |
| 5,979,757 A | 11/1999 | Tracy et al. | 235/383 |
| 5,997,928 A | 12/1999 | Kaish et al. | |
| 5,999,914 A | 12/1999 | Blinn et al. | 705/26 |
| 6,012,834 A | 1/2000 | Dueck et al. | |
| 6,014,634 A | 1/2000 | Scroggie et al. | |
| 6,021,394 A | 2/2000 | Takahashi | |
| 6,026,370 A | 2/2000 | Jermyn | 705/14 |
| 6,049,777 A | 4/2000 | Sheena et al. | 705/10 |
| 6,064,987 A | 5/2000 | Walker et al. | |
| 6,070,147 A | 5/2000 | Harms et al. | |
| 6,088,682 A | 7/2000 | Burke | |

| | | | |
|---|---|---|---|
| 6,091,956 A | 7/2000 | Hollenberg | 455/456.5 |
| 6,112,191 A | 8/2000 | Burke | |
| 6,119,099 A | 9/2000 | Walker et al. | |
| 6,123,259 A | 9/2000 | Ogasawara | 235/380 |
| 6,138,105 A * | 10/2000 | Walker et al. | 705/10 |
| 6,223,163 B1 | 4/2001 | Van Luchene | |
| 6,267,670 B1 | 7/2001 | Walket et al. | |
| 6,298,329 B1 | 10/2001 | Walker et al. | |
| 6,298,331 B1 | 10/2001 | Walker et al. | |
| 6,317,722 B1 | 11/2001 | Jacobi et al. | 705/14 |
| 6,332,126 B1 * | 12/2001 | Peirce et al. | 705/14 |
| 6,397,193 B1 | 5/2002 | Walker et al. | |
| 6,539,393 B1 | 3/2003 | Kabala | |
| 6,587,835 B1 | 7/2003 | Treyz et al. | 705/14 |
| 6,601,036 B1 | 7/2003 | Walker et al. | |
| 6,820,062 B1 * | 11/2004 | Gupta et al. | 705/16 |
| 7,024,373 B1 | 4/2006 | Reynolds et al. | 705/14 |
| 2001/0037250 A1 | 11/2001 | Lefkowitz | 705/26 |

FOREIGN PATENT DOCUMENTS

| | | |
|---|---|---|
| EP | 85546 A | 8/1983 |
| EP | 0 109 189 A1 | 5/1984 |
| EP | 512413 A | 11/1992 |
| EP | 0 817 138 A1 | 1/1998 |
| GB | 2317478 A | 3/1998 |
| JP | 58132886 A | 8/1983 |
| JP | 2001093 A | 1/1990 |
| JP | 2208798 A | 8/1990 |
| JP | 4235700 A | 8/1992 |
| JP | 5242363 A | 9/1993 |
| JP | 7065218 A | 3/1995 |
| JP | 8030848 A | 2/1996 |
| JP | 8-147545 | 6/1996 |
| JP | 8221645 A | 8/1996 |
| JP | 8329323 A | 12/1996 |
| JP | 9016836 A | 1/1997 |
| JP | 9062908 A | 3/1997 |
| KR | 9503826 | 4/1995 |
| WO | WO 96/36926 | 11/1996 |
| WO | WO 97/24701 | 7/1997 |
| WO | WO 97/28510 | 8/1997 |
| WO | WO 97/35441 | 9/1997 |
| WO | WO 97/46961 | 12/1997 |
| WO | WO 97/50064 | 12/1997 |

OTHER PUBLICATIONS

Interactive home shopping: Consumer, retailer, and manufacturer incentives to participate in electronic marketplaces, Joseph Alba, John Lynch, Barton Weitz, Chris Janiszewski, et al.Journal of Marketing.Chicago: Jul. 1997.vol. 61,Iss.3;p. 38, 20 pages.*
Michael Schrage, "Free Stuff! Predatory pricing or creative cross-promotion? You be the judge; The Beta Version; Industry Trend or Event; Column", Marketing Computers, Oct. 1995, No. 9, vol. 15, p. 24.
Website: "Verbind Technology", Verbind, Inc., http://www.verbind.com/tech.html, Download Date: Jul. 30, 1999.
Website: "Net Perceptions", http://www.netperceptions.com/company/indexB.html, Download Date: Aug. 2, 1999.
Office Action for U.S. Appl. No. 09/085,424, dated Jun. 10, 1999, 5pp.
Notice of Allowability for U.S. Appl. No. 09/885,424 dated Feb. 11, 2000, 4pp.
Office Action for U.S. Appl. No. 09/571,210 dated Apr. 23, 2001, 14pp.
Office Action (Interview Summary) for U.S. Appl. No. 09/571,210, dated Jul. 25, 2001, 4pp.
Office Action for U.S. Appl. No. 09/571,210 dated Oct. 10, 2001, 10pp.
Notice of Allowability for U.S. Appl. No. 09/571,210 dated Apr. 16, 2002, 4pp.
Notice of Allowability for U.S. Appl. No. 09/571,210 dated Mar. 3, 2003, 5pp.
Office Action for U.S. Appl. No. 09/606,364, dated Aug. 20, 2003, 8pp.
Office Action for U.S. Appl. No. 09/606,364, dated Oct. 7, 2004, 20pp.
Office Action for U.S. Appl. No. 09/606,364, dated Jul. 22, 2005, 18pp.
Office Action for U.S. Appl. No. 09/606,364, dated Jan. 17, 2006, 11pp.
Office Action for U.S. Appl. No. 09/606,364, dated May 24, 2006, 2pp.
Office Action for U.S. Appl. No. 09/606,364, dated Jan. 31, 2007, 7 pp.
Office Action for U.S. Appl. No. 09/606,364, dated Sep. 21, 2007, 12pp.
Schrage, Michael, "An Experiment in Economic Theory: Labs Testing Real Markets", The Record, Nov. 26, 1989, Sunday, All Editions, Business Section at p. B01, 3pp.
Del Rosso, Laura, "Ticket-bidding Firm Closes its Doors; Marketel International Brief Article", Travel Weekly, Mar. 12, 1992, vol. 51; No. 21; ISSN: 0041-2082 at p. 1, 2pp.
Gapper, John, "NatWest Reports Rise in Bad Debt", Financial Times, Jul. 31, 1996, London Edition, 3, News: UK Section at p. 09, 1pg.
Fickenscher, Lisa, "Merchant: American Express Seeks to Mine Its Data on Cardholder Spending Patterns," The American Banker, Mar. 24, 1997, Section: Credit/Debit/ATMS, p. 20, 2pp.
Dalton, Gregory, "As the Technology to Gather Customer Data Online Gets More Sophisticated, Businesses Walk a Tightrope Between Use and Abuse", Information Week, Mar. 20, 1999, N727, p. 18, 4pp.
Sanchez, Marcos, "Move Over Content, Context Is King", Business and Management Practices, Mar. 13, 2000, vol. 2, No. 10; p. 26, 3pp.
"Trilogy Dynamic Pricing Solutions", Trilogy™ Enterprise Class E-Business Solutions, (http://trilogy.com), download date: May 2, 2000, 2pp.
"PriceBreak Product Description", Triangle Research Inc. (http://triangleresearch.com), download date: May 2, 2000, 4pp.
"Mercantec E-Commerce Solutions . . . " (http://www.mercnatec.com), download date: May 2, 2000, 1 pg.
U.S. Appl. No. 09/085,424 entitled, "System and Method For Dynamic Assembly of Packages in Retail Environments", filed May 27, 1998, 40pp.
Belgum, Karl D., "Legal Issues in Contracting on the Internet", Aug. 4, 2008 (http://library.lp.findlaw.com/articles/file/00053/02876/title/Subject/topic/Contracts%20Law_Other/filename/contractslaw_1_105), download date: Aug. 11, 2003, 7pp.
Eldridge, Earle, "CarMax Learning Curve Turns Upward; Auto Stores Begin to Profit", USA Today, Sep. 22, 1999, at p. B03, 4pp.
Greenwald, John, "Buying A Car Without the Old Hassles", Time, Mar. 18, 1996, vol. 147, Iss. 12; at p. 74, 3pp.
Tice, Carol, "Web Ordering May Alter Role Of Distributors", National Home Center News, Jun. 22, 1998, 6pp.
U.S. Appl. No. 60/200,325 entitled, "Method of Duty Free Shopping", filed Apr. 28, 2000, 16pp.
"Introducing the Digital MenuBoard", Siren Technologies, Inc.
Brochure: "Reaching Out In New Directions", Fist Data Corporation, Merchant Services, undated.
"Cape Town", Reuters Ltd., Copyright 1979.
"Save the Mark", Financial Times (London), Feb. 1, 1983, Section I, Men & Matters, p. 12.
Cook, Louise, "ConsumerWatch: Clip, Snip, Save", The Associated Press, Mar. 12, 1984, Section: Business News.
Greene, Jan, "Farm bills please assns; National Grocers Association", Supermarket News, Dec. 23, 1985, Section: vol. 35, p. 6, ISSN: 0039-5803.
"POS spectrum: a lottery looks to POS for growth", POS News, Jan. 1989, Section: vol. 5, No. 7, p. 8, ISSN: 0896-6230, CODEN: BHORAD.
Kuttner, Robert, "Computers May Turn The World Into One Big Commodities Pit", Business Week, Sep. 11, 1989, Section: Economic Viewpoint; No. 3123, p. 17.
"Let's Play the Cash Register Receipts Lottery", The New York Times, Dec. 25, 1990, Section 1, p. 30, col. 4, Editorial Desk.
Nakayama, Atsushi, "Coca-Cola machines to be 'smarter'", The Japan Economic Journal, Feb. 23, 1991, Section: Industry: Chemicals, p. 22.

Del Rosso, Laura, "Marketel says it plans to launch air fare 'auction' in June", Travel Weekly, Apr. 29, 1991, Section: vol. 50, No. 34, p. 1, ISSN: 0041-2082.

"Philips offers customers financing through Citicorp; Philips Medical Systems North America, Citicorp North America Inc.", Health Industry Today, Jun. 1991, Section: vol. 54, No. 6, p. 4, ISSN: 0745-4678.

Pelline, Jeff, "Travelers Bidding On Airline Tickets SF firm offers chance for cut-rate fares", The San Francisco Chronicle, Aug. 19, 1991, Section: News, p. A4.

Mulher, F.J. et al., Implicit Price Bundling of Retail Products: A Multiproduct Approach to Maximizing Stroe Profitability, Journal of Marketing, Oct. 1991, vol. 55, Issue 4, p. 63,14, ISSN: 0022-2429.

Matutes, Carmen, et al., "Compatibility and bundling of complementary goods in a duopoly; Symposium on Compatibility", Journal of Industrial Economics, Mar. 1992, Section: vol. 40, No. 1, p. 37, ISSN: 0022-1821.

Del Rosso, Laura, "Ticket-bidding firm closes its doors; Marketel International", Travel Weekly, Mar. 12, 1992, Section: vol. 51, No. 21, p. 1, ISSN: 0041-2082.

"Coupons get serious", Chain Store Age Executive with Shopping Center Age, Oct. 1992, Section: vol. 68, No. 10, p. 68, ISSN: 0193-1199.

Gilbert, Allan Z., "Operators can gain with creative merchandising", Automatic Merchandiser, Oct. 1992, p. 80, ISSN: 1061-1797.

"Winn-Dixie/The Salvation Army Report Contributions For War Against Hunger", PR Newswire, Jun. 10, 1993, Section: Financial News.

Jones, Jeanne, "Data Readers Streamline Management . . . ", The Houston Post, Jun. 26, 1994, Section: Business, p. D1.

Fiorini, Phillip, "No Place For Penny?", USA Today, Jul. 29, 1994, Section: News, p. 1A.

"They dynamics of micromarketing: pinpointing your customers.", Progressive Grocer, Oct. 1994, vol. 73, ISSN: 0033-0787.

Smith, Alison, "Survey of UK Consumer Credit and Asset Finance", Financial Times, Nov. 3, 1994, p. VI.

Salinger, Michael A., "A graphical analysis of bundling.", The Journal of Business, Jan. 1995, Section: vol. 68, No. 1, p. 85, ISSN: 0021-9398.

Andreoli, Tom et al., "Cash Machines Offer A Whole Lotto Money . . . ", Crain's Chicago Business, Jun. 19, 1995, Section: News, p. 8.

"Spain: BBV launches new card", Cards International, Jun. 22, 1995, p. 5.

Garry, Michael, "Oh baby!", Progressive Grocer, Jul. 1995, p. 39, 42.

Knippenberg, Jim, "Will local radio empires strike back?", The Cincinnati Enquirer, Jul. 23, 1995, Section: Tempo, p. F01.

Brochure: "Cyberbid", Copyright 1996, Net Fun Ltd.

Maras, Elliot, "Software opens doors to scientific machine menuing", Automatic Merchandiser, Feb. 1996, Section: p. 36, ISSN: 0002-7545.

McKinney, Jeff, "Merchant program could pay off for Provident", The Cincinnati Enquirer, Mar. 24, 1996, Section: Financial, p. E02.

Hadley, Kimberly, "Pastors praying anit-arson effort will burn bias", The Nashville Banner, Jul. 26, 1996, Section: News, p. A13.

Gilbert, Allan Z, "A call to action for wireless data communication", Automatic Merchandiser, Aug. 1996, Section: Financial Management.

"Lynx Technology: Lynx to provide business leasing programme through Schroder Leasing", M2 Presswire, Aug. 9, 1996.

Taylor, Paul, "Towards a dream market", Financial Times, Sep. 4, 1996, Section: Survey—FT IT, p. 03.

"Public Internet Kiosks, Inc. Receives First Order For Its 'Internet Station'", PR Newswire Association, Inc., Sep. 16, 1996.

"Bigger Plans", Card Fax, Oct. 1996, Section: vol. 96, No. 178, p. 2.

Fickenscher, Lisa, "Amex to Start Free Rewards Program with Discounts on Merchandise", The American Banker, Oct. 18, 1996, Section: Credit/Debit/ATMs, p. 10.

Fitzgerald, Kate, "Amex Program Moves Loyalty to Next Level: Custom Extras Finds A Medium Customers Can't Ignore: Billing Statements", Advertising Age, Nov. 4, 1996, Section: News, p. 2.

Bonnici, Joseph et al., "Consumer issues in coupon usage: An exploratory analysis", Journal of Applied Business Research, Winter 1996/1997, Section: vol. 13, No. 1, pp. 31-40, ISSN: 0892-7626, CODEN: JPBEBK.

Rehayem, Gilbert, "Opinion: X-Press Betting", La Fleur's Lottery World, Feb. 7, 1997.

Quittner, Jeremy, "Ohio's Provident brings its discount card to Fla.", American Banker, Feb. 11, 1997, vol. 162, Issue 28, p. 11, 1/3 pg., ISSN: 0002-7561.

Symons, Allene, "Lucky, Sav-on debut Rewards Card.", Drug Store News, Feb. 17, 1997, vol. 19, Issue 4, p. 3, 2p, 1c., ISSN: 0191-7587.

Mckeveny, Alexander, "Giving them a good reason.", Bank Marketing, Mar. 1997, vol. 29, Issue 3, p. 37, 4p, 4c, ISSN: 0888-3149.

Singletary, Michelle, "Electronic World, Unchecked Problem?", The Washington Post, Mar. 4, 1997, Section: Financial, p. C01.

Kelsey, John and Schnieier, Bruce, "Conditional Purchase Orders", Fourth ACM Conference on Computer Communication Security, Apr. 1997, ACM Press, pp. 117-124.

French, Simone et al., "A Pricing Strategy to Promote Low-Fat Snack Choices through Vending Machines", American Journal of Public Health, May 1997, vol. 87, No. 5, pp. 849-851.

"Dispensing the Future", Electronic Payments International, May 1997, Section: Feature, p. 12.

"Avco Financial Services.", (http //www homefurnish com/NHFA/ avco htm), download date: May 23, 1997.

"Products and Services, Checkout Direct", Catalina Marketing Corporation, (http //catalinamktg com/prodcdir htm), download date: May 29, 1997.

"Industry Briefs", Card News, Jun. 9, 1997, vol. 12, No. 11.

Riordan, Teresa, "Patents; A novel approach to making a better spermicide harks back to some old-fashioned methods.", The New York Times, Jun. 9, 1997, Section D, p. 2, col. 1, Business/Financial Desk.

Nairn, Geoff, "The key to your identity: Falling costs will allow fingerprint verification to be widely used", Financial Times (London), Jul. 15, 1997, Section: Technology, p. 12.

"How It All Works", The United Computer Exchange, (http //www uce com/howitworks html), download date: Jul. 23, 1997.

"Classifieds2000: The Internet Classifieds", (http //www classifieds2000 com/cgi-cls/Display exe?C2K+aboutus), download date: Aug. 6, 1997.

"General trading information and terms provided by tradingfloor. com", Tradingfloor.com, (http //www tradingfloor com/info htm), download date: Aug. 14, 1997.

"Nasdaq", (http //home axford com/corfin/corf11 htm), download date: Aug. 15, 1997.

Prochaska-Cue, Kathy, "Acquiring Credit", (http://ianrwww unl edu/ IAN/PUBS/NEBFACTS/NF91-2.HTM), download date: Sep. 3, 1997.

"ONSALE: Auction Supersite", Welcome to ONSALE, download date: Sep. 8, 1997.

"About IAO", Interactive Auction Online, download date: Sep. 8, 1997.

Hoeschen, Brad, "Brookfield Square hopes mall card strikes a chord", Business Journal-Milwaukee, Sep. 12, 1997, Section: vol. 14, No. 50, p. 19.

Website, "NCR 7452 Workstation", (http //www ncr com/products/ retail/products/catalogs/7452 shtm), download date: Sep. 23, 1997.

Kirk, Jim, "Digital Promotions Make Quick Point—McDonald's Testing New Technlogy on its Menus", Chicago Tribune, Dec. 26, 1997, pp. 1-2.

"NCR 7453 PC-Based Point-of-Sale Solution", NCR Corporation, Copyright 1998.

Progressive Introduces Kitchen Display System (KDS) for Restaurants, PR Newswire, Jan. 23, 1998, Financial News Section.

"From Our Family To Yours . . . 5 Weeks of Coupon Values for a Valuable Customer!", Wakefern Food Corporation, Feb. 1998.

Website: "VendMaster—News", (http //www vendmaster com/ news_main html), download date: Feb. 6, 1998.

Website: "VendMaster—Reports", (http //www vendmaster com/ reports_main html), download date: Feb. 6, 1998.

Blair, Adam, "JICC Coupon Guide Recommends Upgrades at Front End", Supermarket News, Feb. 9, 1998 at p. 23, ISSN: 0039-5803.

Livingston, Kimball, "In-Store Systems—VideOcart Redux", RT Magazine, Mar. 1998, pp. 29-30.

"Advanced Mechanics Internet Specials", Advanced Mechanics, (www://www metroplexweb com/advcpn2 htm), download date: Mar. 12, 1998.

"U.P.C. Coupon Code Guidelines Manual—Section . . . ", Uniform Code Council, Inc., (http://www uc-council org/d31-3 htm), download date: Mar. 12, 1998.

Hamstra, Mark, "Segment Study: 'Made-For-You' Maneuvers Signal Competitive Shift In QSR Category", Nations Restaurant News, Apr. 13, 1998, at p. 54.

"POSitive Input: The McDonald's POS-3 System Newsletter from Olivetti Solutions/OLSY", McDonald's, Spring/Summer Edition, 1998, 8 pp.

"Promotion Times, An SCA Quarterly Newsletter—First Quarter, 'New Wave' Marketing", Apr. 1998.

"For the Crew & the Customer", Olivetti, Winter, 1998.

"Universal Holding Cabinet Rollout Program", Brochure, H&K Dallas Inc., Winter 1998.

Brochure: "It's in the Bag. Introducing the Universal Holding Cabinet from Welbilt.", Frymaster, Winter 1998.

Office Action for U.S. Appl. No. 09/606,364 mailed Apr. 19, 2010, 16 pp.

Office Action for U.S. Appl. No. 09/606,364 mailed Nov. 18, 2008, 13 pp.

Office Action for U.S. Appl. No. 09/606,364 mailed Feb. 21, 2008, 10 pp.

Notice of Allowability for Application No. mailed Apr. 16, 2002, 3 pp.

* cited by examiner

← 122A

| PRODUCT IDENTIFIER 202 | COST 204 | RETAIL PRICE 206 | MINIMUM PRICE 208 |
|---|---|---|---|
| P100 | $60.00 | $80.00 | $65.00 |
| P101 | $40.00 | $50.00 | $45.00 |
| P102 | $30.00 | $40.00 | $34.00 |
| P103 | $25.00 | $40.00 | $35.00 |
| P104 | $100.00 | $150.00 | $125.00 |
| P105 | $90.00 | $100.00 | $98.00 |
| P106 | $45.00 | $60.00 | $60.00 |
| P122 | $30.00 | $35.00 | $32.00 |

FIG. 2A

|  | PRODUCT IDENTIFIER 202 | ASSOCIATED SECONDARY PRODUCTS 224 | "PICK ONE" PACKAGE PRICE 226 | "PICK TWO" PACKAGE PRICE 228 |
|---|---|---|---|---|
| 210B → | P100 | P122; P118; P113 | $115.00 | $150.00 |
| 211B → | P101 | P102; P105; P109 | $115.00 | $130.00 |
| 212B → | P102 | P109; P134; P148; P123 | $65.00 | $90.00 |
| 213B → | P103 | P116; P118; P144; P109 | $60.00 | $80.00 |
| 214B → | P104 | P110; P130; P143 | $200.00 | $250.00 |
| 215B → | P105 | P108; P112; P119; P121 | $130.00 | $160.00 |
| 216B → | P106 | P114; P119; P108; P137 | $85.00 | $110.00 |
| 217B → | P107 | P123; P134; P143 | $50.00 | $70.00 |

| | PRODUCT IDENTIFIER 202 | FIRST ASSOCIATED SECONDARY PRODUCTS 234 | SECOND ASSOCIATED SECONDARY PRODUCTS 236 | PACKAGE PRICE 238 |
|---|---|---|---|---|
| 210C → | P100 | P109; P113; P143 | P130; P143 | $100.00 |
| 211C → | P101 | P118; P135 | P118; P138 | $95.00 |
| 212C → | P102 | P108; P110 | P108; P123 | $80.00 |
| 213C → | P103 | P123; P134 | P119; P140 | $85.00 |
| 214C → | P104 | P124; P136 | P133; P144; P121 | $220.00 |
| 215C → | P105 | P117; P118; P130 | P108; P123; P115 | $140.00 |
| 216C → | P106 | P112; P130 | P112; P130 | $100.00 |
| 217C → | P107 | P119; P140 | P134; P154 | $90.00 |

| PRODUCT IDENTIFIER 202 | FIRST ASSOCIATED SECONDARY PRODUCTS 234 | FIRST PACKAGE PRICE 242 | SECOND ASSOCIATED SECONDARY PRODUCTS 236 | SECOND PACKAGE PRICE 244 |
|---|---|---|---|---|
| P100 | P109; P113; P143 | $150.00 | P130; P143 | $150.00 |
| P101 | P118; P135 | $100.00 | P118; P138 | $90.00 |
| P102 | P108; P110 | $95.00 | P108; P123 | $125.00 |
| P103 | P123; P134 | $75.00 | P119; P140 | $90.00 |
| P104 | P124; P136 | $200.00 | P133; P144; P121 | $180.00 |
| P105 | P117; P118; P130 | $160.00 | P108; P123; P115 | $160.00 |
| P106 | P112; P130 | $100.00 | P112; P130 | $90.00 |
| P107 | P119; P140 | $100.00 | P134; P154 | $90.00 |

FIG. 2D

| PRODUCT IDENTIFIER 202 | SECONDARY PRODUCT IDENTIFIER 254 | SECONDARY PRODUCT IDENTIFIER 256 | PACKAGE PRICE 258 |
|---|---|---|---|
| P198 | P104 | P119 | $300.00 |
| P087 | P023 | P333 | $125.00 |
| P151 | P149 | P231 | $50.00 |
| P227 | P228 | P309 | $100.00 |

FIG. 2E

| SESSION IDENTIFIER: S12345678 | | 302 |
|---|---|---|
| PRODUCT IDENTIFIER 202 | "TIME SELECTED" 306 | "TIME RELEASED" 308 |
| P101 | 4:10:22 | 4:11:18 |
| P104 | 4:12:58 | 4:14:16 |
| P102 | 4:14:17 | 4:14:21 |
| P122 | 4:14:22 | 4:15:34 |

300

310 → (P101 row)
311 → (P104 row)
312 → (P102 row)
314 → (P122 row)

| TRANSACTION IDENTIFIER: T987654321 | | | | 402 |
|---|---|---|---|---|
| SESSION IDENTIFIER: S123454678 | | | | 302 |
| PAYMENT IDENTIFIER: 1111-2222-3333-4444 | | | | 404 |
| PURCHASE TOTAL: $307.79 | | | | 408 |
| PACKAGE OFFERED?   YES | | | | 410 |
| PACKAGE ACCEPTED?   YES | | | | 412 |
| PRODUCT IDENTIFIER 202 | RETAIL PRICE 206 | PRICE PAID 406 | PACKAGE PRODUCT? 414 | STATUS 416 |
| P101 | $50.00 | $45.00 | Y; P | PAID |
| P104 | $40.00 | $34.00 | Y | PAID |
| P102 | $150.00 | $125.00 | Y | PAID |
| P122 | $85.00 | $85.00 | N | PAID |

CUSTOMER IDENTIFIER: C987654321 — 200 — 550

| PRODUCT IDENTIFIER 202 | DATE OF INTEREST 560 | PURCHASE STATUS 562 | PACKAGE STATUS 564 | DISCOUNT 566 | TRANSACTION IDENTIFIER 568 | SESSION IDENTIFIER 570 |
|---|---|---|---|---|---|---|
| P228 | 5/19/99 | PURCHASED | OFFERED; ACCEPTED | 15% | T876543219 | S23456789 |
| P392 | 5/27/99 | PURCHASED | OFFERED; DECLINED | 5% | T765432198 | S34567891 |
| P421 | 5/27/99 | PURCHASED | OFFERED; ACCEPTED | 20% | T654321987 | S4567892 |
| P199 | 5/30/99 | NOT PURCHASED | OFFERED; DECLINED | 10% | N/A | S56789123 |
| P199 | 6/2/99 | PURCHASED | OFFERED; ACCEPTED | 15% | T432198765 | S67891234 |
| P163 | 6/18/99 | NOT PURCHASED | NOT OFFERED | N/A | N/A | S78912345 |

551 → row 1, 552 → row 2, 553 → row 3, 554 → row 4, 555 → row 5, 556 → row 6

DETERMINATION AND PRESENTATION OF PACKAGE PRICING OFFERS IN RESPONSE TO CUSTOMER INTEREST IN A PRODUCT

CROSS-REFERENCE TO RELATED APPLICATIONS

The present application is a Continuation-In-Part of commonly-owned U.S. patent application Ser. No. 09/085,424, filed May 27, 1998 and entitled "SYSTEM AND METHOD FOR DYNAMIC ASSEMBLY OF PACKAGES IN RETAIL ENVIRONMENTS", which issued as U.S. Pat. No. 6,138,105 on Oct. 24, 2000. The entire contents of this Patent are hereby incorporated by reference into the present Application.

TECHNICAL FIELD

The present invention relates to retail pricing of products presented to customers as a package. More particularly, the present invention relates to the determination and presentation of retail package pricing offers.

BACKGROUND OF THE INVENTION

Retailers often attempt to increase their overall revenues by encouraging customers to spend more money per visit to a retail establishment. One method retailers have utilized to encourage customers to spend more money during a visit to a retail establishment is to offer a discount for the purchase of multiple units of a single product. Such a discount scheme is typically enticing to customers when offered in connection with non-perishable goods that require replacement over time (e.g. canned goods). However, customers tend not to be persuaded to purchase multiple units of consumer products such as clothing or electronics. Other methods for encouraging customers to spend more money during a visit to a retail establishment have been attempted with varying degrees of success.

In general, customers are more likely to increase expenditures at a retail establishment if they perceive that they are receiving personal attention and/or a discount not available to other customers. As an example, small privately-owned shops ("boutiques") are often successful in encouraging customers to spend more money per visit by providing personal sales assistants to assist their customers. Personal sales assistants are especially effective if they have the authority to offer personalized package pricing discounts to the customers. For example, a sales assistant in an exclusive men's store, when helping a customer who is considering the purchase of a suit, may suggest a shirt and tie to go with the suit. The salesman may offer to sell the shirt and tie for only $50 above the price of the suit (wherein the retail prices of the shirt and tie are $45 and $25, respectively) if the customer agrees to purchase the suit. In this example, the customer is more likely to buy the suit as well as the shirt and the tie. The retailer benefits by completing a transaction and by increasing the purchase total of that transaction. The retailer may be particularly willing to offer a substantial discount on the shirt and tie if a large profit margin is to be realized on the suit.

Larger retailers and retail chains, however, have been unable to take advantage of such a personalized package pricing method. Personalized package pricing in a sizable retail environment would inappropriately place negotiating and price structure power in the hands of a large number of store sales personnel. In order to effectively utilize the above-described personalized price packaging method, store sales personnel would require intimate knowledge of the cost of each item and would require the ability to quickly and correctly determine an attractive, yet still profitable, price package to offer a customer. Placing such negotiating and price structure power in the hands of too many store sales personnel is particularly undesirable due to the potential for fraud and potential loss of profits. Specifically, sales personnel may be apt to sell products at substantial discounts to their friends and family.

On-line retailers suffer from the same inability to offer personalized package pricing discounts and are thus unable to encourage customers to purchase items which are of interest to the customers, while simultaneously increasing the customers' purchase totals. In fact, on-line retailers suffer from an acute lack of ability to offer personalized sales assistance to their customers in general.

Accordingly, there remains a need for a system and method to enable retailers, particularly on-line retailers, to provide personalized sales assistance for encouraging customers to complete purchases that they are considering and to increase their purchase total.

SUMMARY OF THE INVENTION

The present invention satisfies the above-described needs by providing a system and method for the determination and presentation of package offers in response to an indication of a customer's interest in a primary product. A retailer may offer products for sale in an on-line retail environment, such as via a web-site, or in a physical retail environment. In response to an indication of interest in a primary product by a customer, a package offer is presented to the customer. A package offer is an offer for sale by a retailer of a package of products at a package price. The package of products typically comprises the primary product and at least one secondary product. The primary product and the at least one secondary product each have a corresponding retail price. A package price is determined for the package, which is typically less than the sum of the corresponding retail prices of the primary product and the at least one secondary product. In one embodiment of the present invention, the determination of the package price and the at least one secondary product included in the package is based on the profit margin of at least one of the primary product and the at least one secondary product.

The package offer is then presented to the customer. If the customer provides a customer response indicating a rejection of the package offer, another package to be offered to the customer may be determined. This other package may comprise (i) the primary product and at least one secondary product that is different from at least one of the previously included at least one secondary products, or (ii) the primary product and the same at least one secondary product at a package price that is lower than the previously presented package price. If the customer response indicates a payment identifier and/or an acceptance of the package offer, a financial account identified by the payment identifier may be charged for the amount of the package price. Upon completion of the transaction with the customer, transaction data relating to sale of the package may be stored in a database.

Package products of an accepted package offer may be shipped to the customer automatically or upon request by the customer. Alternately, the customer may be provided with a code identifying the package offer and product identifiers for the package products. The customer may visit a retail establishment to pick up the package products and may provide the code to the retailer for input into a point-of-sale terminal. The point-of-sale terminal may be in communication with a central server, which may in turn be in communication with a database storing the code and the product identifiers for the package products. Thus, the point-of-sale terminal may be operable to communicate with the central server in order to determine the package price to be charged to the customer or to verify that the package price has already been charged to the financial account of the customer. If necessary, the point-of-sale terminal may communicate with a financial institution to charge the package price to the financial account of the customer.

The present invention may be practiced in a multi-retailer embodiment. For example the primary product may be sold by a first retailer and a secondary product may be sold by a second retailer. Upon completion of the transaction with the customer, appropriate portions of the charged package price may be distributed to the first retailer and the second retailer. A central server may be operable to handle the transaction on behalf of the multiple retailers and to distribute the appropriate funds.

BRIEF DESCRIPTION OF THE DRAWINGS

FIG. 2 comprising FIG. 2A, FIG. 2B, FIG. 2C, FIG. 2D, and FIG. 2E is an illustration of various illustrative configurations of a product database in accordance with exemplary embodiments of the present invention.

FIG. 3 illustrates an exemplary session table of a session database in accordance with an exemplary embodiment of the present invention.

FIG. 4 illustrates an exemplary transaction table of a transaction database in accordance with an exemplary embodiment of the present invention.

FIG. 5 illustrates an exemplary customer table of a customer database in accordance with an exemplary embodiment of the present invention.

DETAILED DESCRIPTION OF THE EXEMPLARY EMBODIMENTS

Figure 1A:
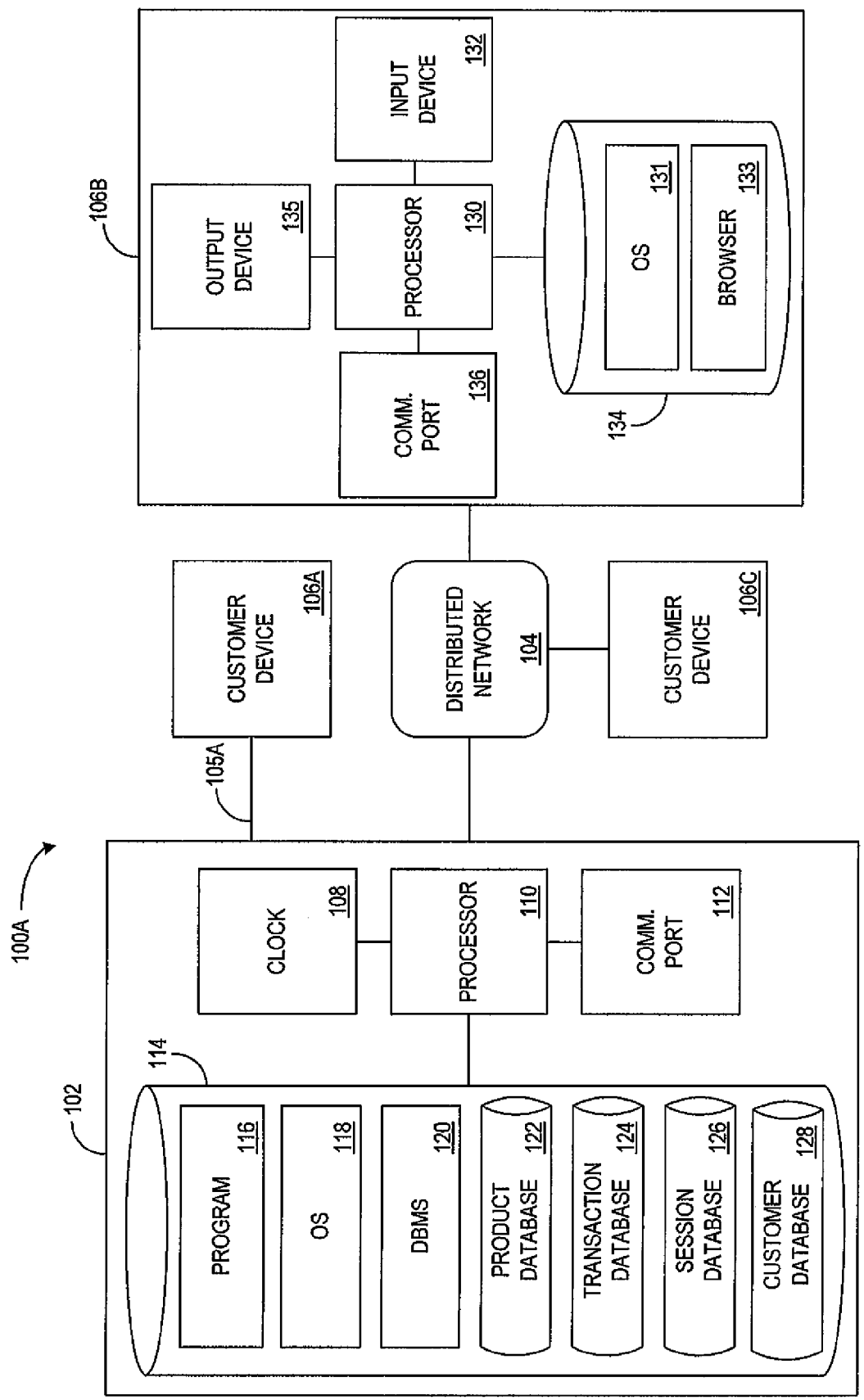
FIG. 1, comprising FIG. 1A, FIG. 1B and FIG. 1C, provides an overview block diagram of various systems in accordance with exemplary embodiments of the present invention.

The present invention provides a system and method to enable retailers, particularly on-line retailers, to determine that a product is of interest to a customer and to determine a package of products to be offered to the customer, at a package price. In response to detecting an expression of interest by a customer in a particular product, referred to herein as a primary product, a package is determined. Determining a package may comprise (i) retrieving a predetermined package of products associated with the product of interest to the customer from a database, or (ii) assembling a package based on predetermined considerations. A package may be assembled using various considerations. Applicant's co-pending U.S. patent application Ser. No. 09/085,424, filed May 27, 1998, entitled "SYSTEM AND METHOD FOR DYNAMIC ASSEMBLY OF PACKAGES IN RETAIL ENVIRONMENTS" discloses a method and system for assembling packages of products based on revenue-management theories, available inventory, and complementary families of products. For example, a package of product may be assembled based on product information such as sales performance data such as inventory availability and demand rate. The products included in a package may be selected such that each product is selected from a different department of the retailer (e.g. one product is from the deli department and another product is from the house-wares department). Furthermore, customer may be rewarded for accepting packages that include products from a variety of department, or from complementary departments, by being offered package prices that are more discounted than package prices for packages that do not include products from complementary, or a variety of, departments.

The package may comprise, for example, the primary product and at least one secondary product. A package price is then determined for the package. The package price may be less than the sum of the retail prices of each of the package products (i.e., the primary product and the at least one secondary product). The customer is presented with a package pricing offer (for brevity referred to herein as a "package offer"), which is an offer for the sale of the package of products at the package price.

Detecting that a primary product is of interest to the customer may involve detecting that information relating to the primary product is displayed on a web-page viewed by the customer for a pre-determined amount of time, detecting an input signal generated by the customer in response to information displayed on a web-page relating to the primary product, detecting that the customer has added the primary product to a virtual shopping cart, or detecting a keyword input by the customer into an input field on a web-page and determining that the keyword relates to the primary product. Other signals transmitted from a customer device may also be interpreted as an expression of interest by the customer in the primary product. Also, the customer may explicitly indicate an interest in the primary product by requesting to be presented with a package offer associated with the primary product.

As disclosed above, a package may be determined in a variety of ways. For example, a package may be determined by accessing a database to locate a pre-determined package associated with the primary product identifier. Determining a package may also involve accessing a database to select secondary products from a plurality of available secondary products. The selected secondary products may have a pre-determined relationship with the primary product, such as a similar color, utility, or the like. For example, products that are complementary to one another may be selected for inclusion in a package (e.g. cream cheese and bagels or hot dogs and buns). The secondary product may also be selected based the profit margin of the primary product and/or the profit margin of the secondary product. The database may also store information relating to at least one additional product of interest to the customer. Accordingly, determining a package may involve accessing the database to determine the at least one additional product of interest to the customer and selecting the additional product of interest to the customer as a secondary product for the package. Similarly, the database may store information relating to a previous transaction of the customer, which includes a previously sold product. Determining the package to be offered to the customer may involve accessing the database to determine a previously sold product and selecting a secondary product that has a pre-determined relationship with the previously sold product.

The package price may also be determined in a variety of ways. For example, determining the package price may involve determining a discounted price for each of the secondary products in the package and summing the retail price of the primary product and the discounted prices for the secondary products. The discounted price for each of the secondary products may be based on a profit margin of the primary product. In another embodiment, determining the package price involves determining a discounted price for the primary product and for the secondary products and summing the discounted prices of the primary product and the secondary products. A discounted price for the primary product or the secondary products may be based on a profit margin of the primary product and/or a profit margin of at least one of the secondary products.

A package offer may comprise an offer for sale of a pre-determined number of the secondary products, selected by the customer, at the package price. The package offer may instead comprise an offer for sale of a customer-selected number of the secondary products, wherein the secondary products are selected by the customer from a plurality of available secondary products, at a package price. The package price may thus vary based on the customer-selected number of secondary products. In another embodiment, the package offer may comprise the primary product and a plurality of lists of secondary products. The package offer may comprise an offer for sale of a pre-determined number of the secondary products, wherein one secondary product is selected by the customer from each of the plurality of lists, at the package price. In another embodiment, multiple package offers may be presented to the customer. By way of illustration, a first package offer for sale of a first package at a first package price may be presented to the customer along with a second package offer for sale of a second package at a second package price. The customer may thus choose to accept one or more of the package offers.

Systems in accordance with the present invention may comprise a central server and a customer device. Point-of-sale devices and/or retailer devices may also be included. A central server may include, or be in communication with, a database storing information pertaining to products. A central server may also host or be in communication with a web-site displaying information pertaining to products offered for sale. A central server may thus be operable to determine when a customer has expressed an interest in a primary product, to determine a package, to determine a package price, and to present a package offer to the customer. A central server may also comprise such components as a communications port operable to send and receive data and a processor operable to perform the above-describe functions in response to signals or data received via the communications port.

A customer device may be operable to send input signals, such as data and commands, to the central server. The customer device may send such input signals to the central server via a web-site. A customer device may include such components as a display device, a communications port, and an input device. An input device may be operable to generate an input signal indicating an interest in a primary product. The processor may be operable to manage and control the functions of the customer device, such as executing a browser to display pages of the web-site on the display device, send signals via the communications port to the central server, receive a package offer from the central server via the communications port and display the package offer on the display device. The processor may be operable to perform at least some of the functionality associated with the customer device.

The customer device allows the customer to communicate with a central controller operating in accordance with the present invention and may comprise, for example, a kiosk, personal computer, or portable input device, in communication with the central server. A portable input device may comprise, for example, a personal digital assistant (PDA), hand-held bar code scanner, a one-way or two-way pager, or a wire or wireless telephone (e.g. a cellular telephone). The customer device may thus comprise an input device operable to input the primary product identifier, a display device operable to present a package offer received from the central server, and a printer operable to print a printed version of the package offer. In a physical retail embodiment the customer device may be further operable to output a printed version of the package offer that may include a code identifying the package offer and product identifiers for the primary product and the secondary products included in the package. The input device of the customer device may optionally be a bar code reader.

The following description will hereinafter refer to the drawings, in which like numerals indicate like elements throughout the several figures.

Figure 1B:
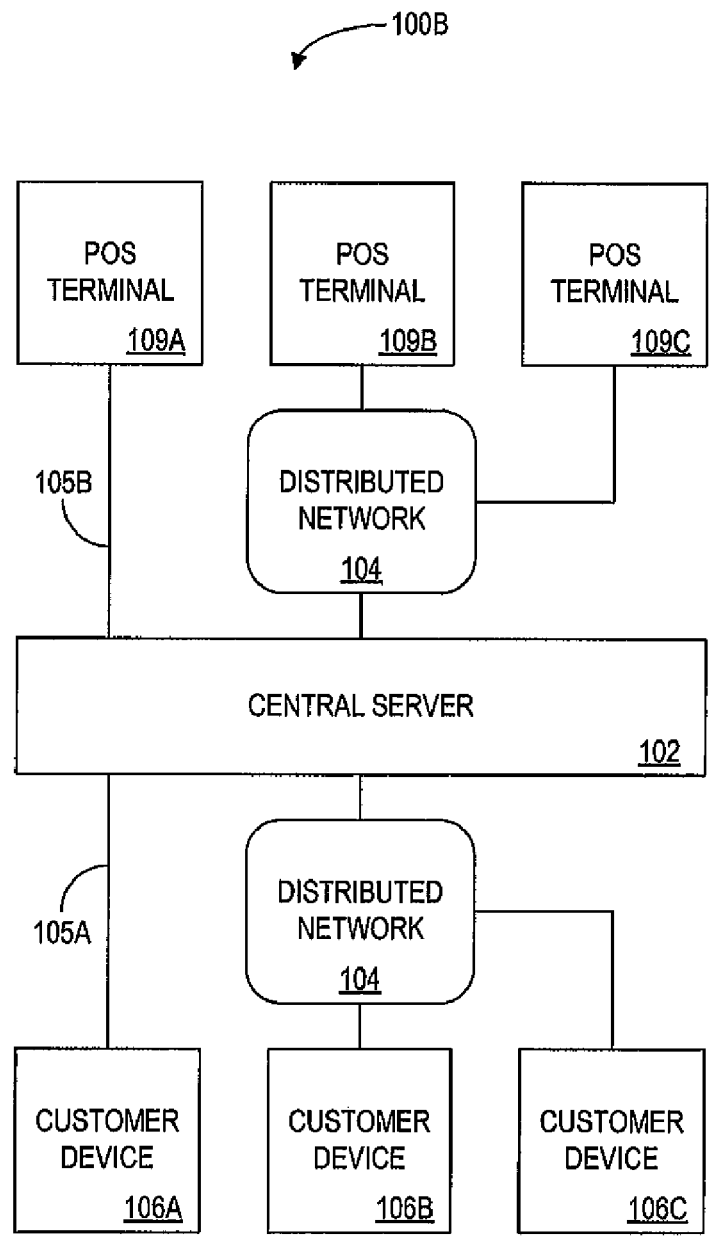
Figure 1C:
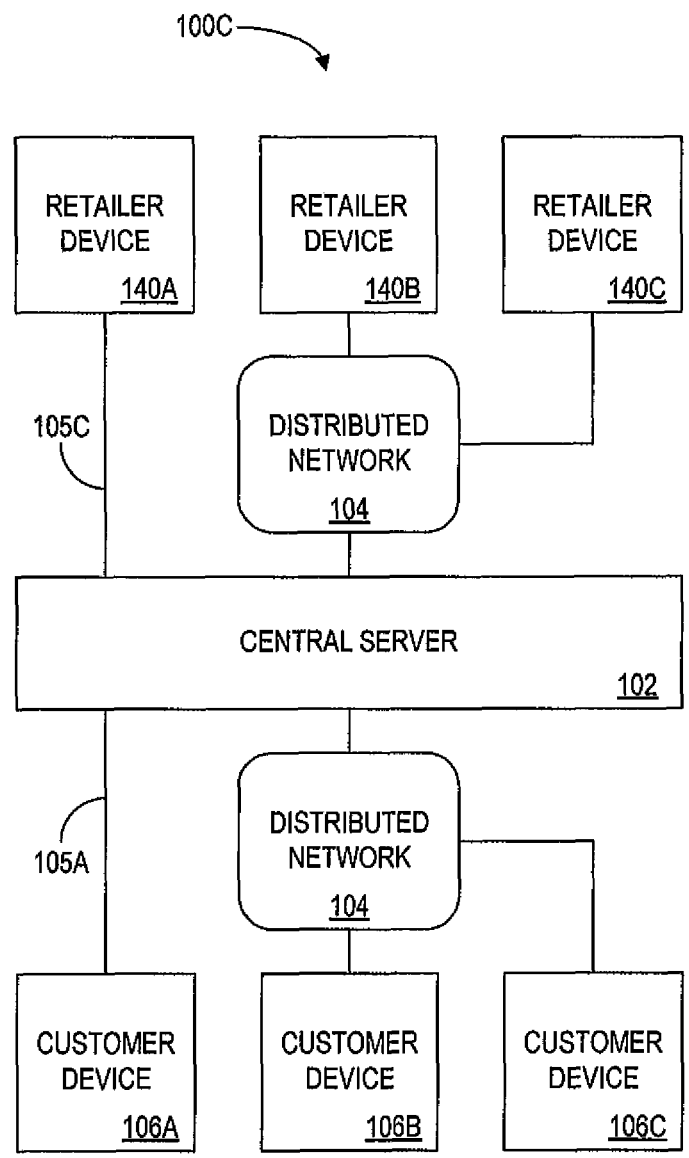

Referring now to FIG. 1, comprising FIG. 1A, FIG. 1B, and FIG. 1C, overview block diagrams of systems 100A-C are provided in accordance with exemplary embodiments of the present invention. As shown in FIG. 1A, a system 100A in accordance with an exemplary embodiment of the present invention may be practiced in an on-line retail environment. In such an embodiment, a central server 102 may host or be in communication with an on-line retail establishment. The central server 102 may be a "web server" of a retailer (e.g. a retailer server). The central server 102 may generate web pages (documents on the World Wide Web that typically include an HTML file and associated graphics and script files) to be accessed via the World Wide Web, and may also allow purchases to be made. A web site may consist of several such web pages and associated databases. According to another embodiment, the central server 102 is a computer associated with the operation of a physical store. Such a computer, for example a point-of-sale (POS) server, would perform tasks such as inventory management and item pricing for the store.

On-line retail establishments are commonly referred to as "virtual stores," "electronic-stores," "e-stores," "Internet stores," "e-commerce" web-sites, "e-business" web-sites, and the like. An on-line retail establishment comprises appropriate hardware and software for displaying web-pages of a web-site in order to advertise products and for completing transactions with customers via the web-site. The term "product" is used herein to refer to a good and/or a service. If the central server 102 does not host the on-line retail establishment, it may be in communication with another server that hosts the on-line retail establishment. For the sake of clarity, it will be assumed herein that the central server 102 hosts the exemplary on-line retail establishment. As should be apparent to those skilled in the art, the entity controlling the central server 102 may be distinct from the on-line retailer.

The central server 102 may comprise a conventional computer system configured with hardware and/or software required for communicating with a distributed network 104 and (optionally) for hosting an on-line retail establishment.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The central server 102 may further comprise a processor 110 for executing various application program modules. Processor 110 may comprise one or more microprocessors, such as Pentium® microprocessors. If the processor comprises a plurality of microprocessors, the plurality of microprocessors may or may not operate in parallel. The processor 110 is in communication with a data storage device 114. The data storage device 114 comprises an appropriate combination of magnetic, optical and/or semiconductor memory, and may include Random Access Memory (RAM), Read-Only Memory (ROM) and/or a hard disk. The processor 110 and the storage device 114 may be, for example (i) located entirely within a single computer or other computing device; (ii) connected to each other by a remote communication medium, such as a serial port cable, telephone line or radio frequency transceiver; or (iii) a combination thereof. In one embodiment, the central server 102 may comprise one or more computers that are connected to a remote server computer for maintaining databases. The data storage device 114 stores a program 116 for controlling the processor 110. The processor 110 performs instructions of the program 116, and thereby operates in accordance with the present invention, and particularly in accordance with the methods described in detail herein. The program 116 may be stored in a compressed, uncompiled and/or encrypted format. The program 116 furthermore includes program elements that may be necessary, such as "device drivers" for allowing the processor 110 to interface with computer peripheral devices. Appropriate device drivers and other necessary program elements are known to those skilled in the art, and need not be described in detail herein.

The storage device 114 also stores (i) an application program module operating system (OS) 118, (ii) a database management system (DBMS) 120, (iii) a product database 122, (iv) a transaction database 124, (v) a session database 126, and (vi) a customer database 128. The databases 122, 124, and 126 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information, and those skilled in the art will understand that the number and content of the entries can be different from those illustrated herein.

Central server 102 further comprises a communications port 112 for sending data to and receiving data from customer devices 106A, 106B and 160C. The processor 110 may also be in communication with a clock 108 that generates signals representing time and date.

Customer devices 106A, 106B and 106C may comprise conventional computer systems, kiosks, personal digital assistants (PDAs), or any other device configured with hardware and/or software for communicating with the distributed network 104. Customer device 106B will now de discussed in detail. It should be understood that customer device 106B may be representative of customer devices 106A and 106C. Customer device 106B comprises a processor 130, which may comprise one or more microprocessors such as such as one or more Pentium® microprocessors. If the processor comprises a plurality of microprocessors, the plurality of microprocessors may or may not operate in parallel. The processor 130 is in communication with data storage device 134, which stores various application program modules, such as an operating system (OS) 131 and a "browser" program module 133. The browser program module 133 is operable to interpret web-page files, such as HyperText Mark-up Language (HTML) files, received via the distributed network 104. Customer devices 106A, 106B and 106C may also include other application program modules, such as electronic mail (e-mail) program modules, File Transfer Protocol (FTP) program modules, other file transfer program modules, and the like, to interact with other resources offered via the distributed network 104. Customer devices 106B further comprises a communications port 136 for sending and receiving data. Customer device 106B further comprises peripheral devices, such as an output device 135, an input device 132, or any other well known peripheral device. The output device 135 may comprise a video monitor or other device operative to display at least alphanumeric characters to the customer. The output device may also comprise a printer operative to register indicia on paper or other material, thereby printing receipts. The input device 132 may comprise a keyboard, mouse, touch-screen, or microphone. Many types of input devices and output devices are known to those skilled in the art, and need not be described in detail herein.

As shown, a customer device, as illustrated by customer device 106A, may optionally comprise a bar code reader 132A.

As shown, a customer device, as illustrated by customer devices 106B and 106C, may be in communication with the central server 102 via the distributed network 104. Alternatively, as illustrated by customer device 106A, a customer device may be in communication with the central server 102 via a dedicated communications link 105A. The connections between the various components of the exemplary system 100A may be wire or wireless connections and may comprise, for example, modem, direct network connection or any other means of communicating with the distributed network 104. The distributed network 104 may comprise the Internet, a LAN, a WAN, or more than one interconnected network. Those of ordinary skill in the art will recognize that the network configuration shown in FIG. 1 is by way of example only and is not intended to limit the scope of the present invention.

As shown in FIG. 1B, a system 100B in accordance with another exemplary embodiment of the present invention may be practiced in a physical retail environment. The central server 102 may be configured for communication with one or more point-of-sale terminals 108A, 108B and 108C and one or more customer devices 106A, 106B and 106C located at one or more retail establishments. The connections between the various components of the exemplary system 100B may be via modem, direct network connection or any other means of electronic communication. The central server 102 may be located at the retail establishment or may be remotely located from the retail establishment. As shown, customer devices 106B and 106C and point-of-sale terminals 108B and 108C may communicate with the central server 102 via the distributed network 104. A customer device 106A and point-of-sale terminal 108A may also communicate with the central server 102 via a dedicated communications links (105A and 105B, respectively) or via other means of electronic communication.

As is known in the art, typical point-of-sale terminals are equipped with processors and memory storage devices. Point-of-sale terminals may further comprise peripheral devices such as keypads, barcode readers, credit card readers, other input devices, and display devices. Point-of-sale terminals may also be equipped with hardware and/or software for communicating with a distributed network 104 or a dedicated communications link 105B. Point-of-sale terminals are also customarily operable to communicate with one or more financial institutions via financial networks (not shown) for the purpose of completing financial transactions.

A customer device located at a retail establishment may be referred to herein as a "customer service" device and may comprise a kiosk or a portable data input device, such as a barcode scanner. In one embodiment, a customer may scan a product identifier, such as an SKU (stock keeping unit number) in the format of a one-dimensional or two-dimensional bar code, using a bar code scanner. The bar code scanner may be part of a customer service kiosk or may be a portable device available to the customer. In one variation of this embodiment, a customer may be required to be a member of a "frequent shopper club" in order to have access to the customer service device. The customer service device may transmit the product identifier to the central server 102 for assembly of a package. Assembly of a package at the central server 102 may be performed in the same manner as in an on-line retail environment. The database 114 described above with reference to an on-line retail environment may function equally well in a physical retail environment.

FIG. 1C shows a multiple retailer system 100C in accordance with another exemplary embodiment of the present invention. The central server 102 may be configured to manage package offers for multiple retailers. Accordingly, the system 100C may be employed in situations where a central service maintains the central server 102 and different retailers maintain respective retailer devices 140A, 140B and 140C. Retailers may supply data relating to products and potential packages to the central server 102 via the retailer devices 140A, 140B and 140C. Retailer devices 140B and 140C may communicate with the central server 102 via a distributed network 104. A retailer device 140A may alternately communicate with the central server 102 via a direct communications link 105C. Customer devices 106A, 106B, and 106C are also in communication with central server 102 in the manner described with respect to the embodiments described above. As will be readily apparent to those of skill in the art, multiple retailer embodiments have applicability in either an on-line retail environment or a physical retail environment.

Operation of a system 100C in accordance with a multiple retailer embodiment may best be described by way of example. In an on-line retail environment, a web-site of an on-line retail establishment may administer web-pages relating to products from a first retailer, a second retailer and a third retailer. When the central server 102 determines that a customer is interested in a primary product offered for sale by, for example, the first retailer, the central server 102 may assemble a package that includes the primary product offered for sale by the first retailer, a secondary product offered for sale by the second retailer and another secondary product offered for sale by the third retailer. A package price may be calculated for the package, which reflects a discount in the retail price of one or more of the package products. If the customer accepts the package offer, the central server 102 completes the transaction with the customer (i.e., collects funds in the amount of the package price from the customer), instructs the various retailers to deliver the package products to the customer and settles accounts with each retailer (i.e., provides each retailer with the appropriate amount of funds based on the price of the product sold by the retailer as included in the package price). The tasks of instructing retailers to ship products and settling of accounts may be performed electronically or manually.

The illustrative system architectures described with reference to FIG. 1 have been provided by way of example only. These and other system architectures will be apparent to those of ordinary skill in the art. Accordingly, the scope of the present invention should not be limited by the various system architectures described and shown above.

FIG. 2, comprising FIG. 2A, FIG. 2B, FIG. 2C, FIG. 2D, and FIG. 2E, is an illustration of various illustrative embodiments of a product database 122, as was shown in FIG. 1. Whether the present invention is practiced in an on-line retail environment or in a physical retail environment, the central server 102 may be operable to access a product database 122 in order to assemble a package. As mentioned, there are many ways in which a package may be assembled. The configuration of the product database 122 may depend on the desired approach for package assembly.

FIG. 2A demonstrates a product table 122A that may be used by the central server 102 to assemble packages ad hoc based on other products in which the customer has expressed an interest. As shown, the exemplary product table 122A includes a product identifier 202, a cost 204, a retail price 206 and a minimum price 208 for each product. The exemplary product table 122A stores data records 210A-217A pertaining to various products. These products, identified by product identifiers 202A-H, may represent all or a portion of the products available in inventory, or may represent a dynamic list of products in which the customer has expressed an interest during the current session or over past sessions. As used herein, the term "session" is meant to refer to interaction by a customer with the central server 102 by way of a customer device 106A, 106B or 106C either on-line or in a physical retail establishment. In an exemplary embodiment, a session database 126 (as shown in FIG. 1) may be maintained to dynamically track products in which the customer has expressed an interest (see FIG. 3).

As mentioned, the profit margin to be realized by the retailer may play a significant role in the assembly of a package. While varying packages may be assembled based on products in which the customer has expressed an interest, only certain of these packages may make economic sense for the retailer. Thus, the illustrative product table 122A includes financial data relating to each product. The financial data comprises the cost 204 of the product to the retailer, the retail price of the product 206, and the minimum price 208 at which the retailer or the operator of the central server 102 will allow the product to be offered in a package. Using this financial data in various ways, the central server 102 may calculate a package price for an assembled package and determine whether that package price meets certain pre-defined criteria for profitability. For example, the retailer may specify that a package may only be offered to a customer if the package price reflects less than a 25% reduction in profit margin, as compared to the sum of the retail prices of the package products. Those skilled in the art will recognize that a product may be included in the package at a price that is anywhere between its retail price 206 and its minimum price 208. It may be desirable, in some cases, to include the primary product in the package at its full retail price and to offer discounted prices on only the secondary products in the package.

FIG. 2B demonstrates an alternate configuration of a product database 122 that may be used by the central server 102 to assemble packages. The exemplary product table 122B stores data records 210B-217B pertaining to various products. Each data record 210B-217B includes a list of associated secondary products 224 corresponding to each product identifier 202. Accordingly, when the central server 102 determines that a primary product is of interest to a customer, the central server 102 may access the product table 122B to ascertain a list of secondary products 224 associated with that primary product. The exemplary product table 122B also includes two pre-determined package prices, a "pick one" package price 226 and a "pick two" package price 228. It is envisioned that a package offer may be presented to the customer as a menu of secondary products. If the customer chooses to purchase the primary product and one secondary product from the menu, the "pick one" package price 226 will be effective. Similarly, if the customer chooses to purchase the primary product and two secondary products from the menu, the "pick two" package price 228 will be effective. Alternately, the package offer may be for each of the associated secondary products 224 that correspond to a primary product. A package price for a package including all of the associated secondary products may be calculated based on minimum prices 208 for each product (see FIG. 2A). Also, the associated secondary products included in the package may be selected based on a query of a session database 126 (see FIG. 3) to determine which, if any, of the associated secondary products 224 have been of interest to the customer in the past. Alternate embodiments of the product table 122B will be apparent to those of skill in the art. For example, any number of associated secondary products or pre-determined package prices may be included within the product table 122B.

FIG. 2C demonstrates yet another alternate configuration of a product database 122 that may be used by the central server 102 to assemble packages. The exemplary product table 122C stores data records 210C-217C pertaining to various products. Each data record 210C-217C includes a product identifier 202. Each data record 210C-217C further includes a first list of associated secondary products 234 and a second list of associated secondary products 236 for each product identifier 202. Accordingly, when the central server 102 determines that a primary product is of interest to a customer, the central server 102 may access the product table 122C to retrieve one or more lists of secondary products associated with that primary product based on the product identifier 202 of the primary product. The exemplary product table 122B also includes a pre-determined package price 238. In an exemplary, embodiment, the customer may be presented with two (or more) menus of secondary products, each menu comprising the secondary products included in the first and second associated list, respectively. The customer may be entitled to receive a package, at the predetermined package price 238, comprising one secondary product selected by the customer from a first secondary product menu and one secondary product selected by the customer from a second secondary product menu. As an alternate embodiment, secondary products from either the first list of associated secondary products 234 or the second list of associated secondary products 236 may be included in the package, at the package price 238, without any selection by the customer. Again, alternate embodiment of the exemplary product table 122C will occur to those skilled in the art and are considered to be within the scope of the present invention.

FIG. 2D demonstrates still a further alternate configuration of a product database 122 that may be used by the central server 102 to assemble packages. The exemplary product table 122D stores data records 210D-217D pertaining to various products. Each data record 210D-217D includes a product identifier 202. Each product identifier 202 has associated therewith a first list of associated secondary products 234, a first package price 242 corresponding to the first list of associated secondary products 234, a second list of associated secondary products 236, and a second package price 244 corresponding to the second list of associated secondary products 236. Accordingly, when the central server 102 determines that a primary product is of interest to a customer, the central server 102 may access the product table 122D to retrieve the first list of associated secondary products 234 and/or the second list of associated secondary products 236, based on the product identifier 202 of the primary product, for presentation to the customer.

In one embodiment, the central server 102 may present each list of associated secondary products 234 and 236 to the customer along with the corresponding package prices 242 and 244. The customer may thus be presented with the option to select either a first package or a second package. In another embodiment the central server 102 may select only one list of secondary products (234 or 236) for inclusion in a package to be presented to the customer. In this way, a different package may be presented to the customer each time the customer indicates an interest in a particular product. Selection of a list of associated secondary products (234 or 236) may be based, for example, on random or sequential selection, or on historical data pertaining to the customer.

By way of illustration, the central server 102 may access a session database 126 (described below) to determine whether some of the products in one list of associated secondary products (234 or 236) were of interest to the customer in the past. Similarly, a query of the transaction database 124 or the customer database 128 may reveal that the customer was previously offered certain products and had declined to purchase such products. In addition, a transaction database 124 or a customer database 128 may be accessed to determine whether the customer has a history of accepting package offers involving a particular discount rate. Other methods for selecting between multiple associated secondary products lists (234 or 236) will be apparent to those of ordinary skill in the art.

FIG. 2E demonstrates still a further alternate configuration of a product database 122 that may be used by the central server 102 to assemble packages. The exemplary product table 122E stores data records 210E-213E pertaining to various products. Each data record 210E-213E includes a product identifier 202. Each product identifier 202 has associated therewith a secondary product identifier 254, a secondary product identifier 256, and a package price 258. The product table 122E illustrates an embodiment wherein various products offered for sale by a retailer have predefined associated package offers. In table 122E the predefined package offers comprise the three products indicated by product identifier 202, product identifier 254, and product identifier 256 and package price 258.

Accordingly, when the central server 102 determines that a primary product is of interest to a customer, the central server 102 may access the product database 122E to retrieve a package offer based on the product identifier 202 of the primary product. Thus, the central controller for product "P198" may retrieve product "P104" and product "P119" and present an offer to the customer for all three products for a single package price of "$300.00". The package offers may be previously defined by an operator of the central server 102 or automatically determined and stored based on, for example, revenue management theories.

The above-described product tables 122A, 122B, 122C, 122D and 122E are provided by way of example only. A system in accordance with the present invention may incorporate one or more of the exemplary product tables 122A, 122B, 122C, 122D and 122E, and/or variations and/or combinations thereof. Additionally, those skilled in the art will appreciate that various aspects of the invention may be practiced without the need for a products database 122.

FIG. 3 is an illustrative session table 300 of a session database 126 (as shown in FIG. 1) that may be used to track products determined to have been of interest to a customer in a current session and prior sessions.

The illustrative session table 300 is particularly useful in the on-line retail environment. Each session table 300 is identified by a unique session identifier 302. A session identifier may be associated with a customer by storing a customer identifier and the session identifier 302 in a customer database 128. A session identifier may be assigned to a customer when the central controller first detects that a new customer has entered the web site administered by the central server 102. For example, a session identifier may be assigned when it is detected that a customer has "loaded" or connected to a page of the web site. The session table 300 stores data records 310-313 relating to various products. Each data record 310-313 includes a product identifier 202, a "time selected" 306 and a "time released" 308. In an exemplary embodiment, a web-site may comprise a web-page for each product offered for sale by the on-line retail establishment. Each web-page may have a unique identifier, which may be the same as or different from the product identifier 202. The central server 102 may be operable to detect the time at which a particular web-page is accessed and released by a customer device 106. Thus, the "time selected" 306 may correspond to the time at which the central server 102 detects that the customer has selected (or "loaded") a particular web-page associated with a corresponding product 202. The "time released" may correspond to the time at which the central server 102 determines that the customer has released (or "unloaded") the particular web-page. When the customer releases a web-page, he or she may select another web-page and the central server 102 may record the appropriate information for such other web-page in the session table 300.

The session database record 300 may further include a customer identifier. The customer identifier may comprise information that uniquely identifies a customer or a customer device. In the online embodiment of the present invention, the customer identifier may be included within a "cookie" that is assigned to a customer the first time he visits the web site of the central server 102 and deposited to the customer device as well as stored in the customer database 128. Such a cookie is a block of data (e.g. a block of ASCII text) that a web server (e.g. the central server 102) stores on a customer device (e.g. a personal computer). When a customer returns to the same web site, the browser of the customer device sends a copy of the cookie back to the central controller. Cookies may be used to identify users of the customer terminal, to instruct the central controller to send a customized version of a web page, to submit account information for the user, and for other administrative purposes. In the present invention, a cookie may be used to instruct the central controller to retrieve the session record(s) associated with the cookie in order to determine what products the customer had previously indicated interest in. Alternatively, the cookie may store one or more session identifiers associated with the customer device directly. A person of ordinary skill in the art of web site administration will understand many variations of how to track customer interest in various product over the course of a single or multiple visits (e.g. sessions). A customer identifier may be the same or different than the session identifier. For example, for purposes of tracking several sessions of a single customer, the customer may be assigned a single customer identifier the first time he visits the web-site and a unique session identifier 302 each time he visits the web-site.

The session table 300 may record all customer interactions with a web-site from the time the customer logs on to the web-site until the customer logs off of the web-site, during a single visit to the web-site. The elapsed time between a "time selected" 306 and a "time released" 308 may be useful in determining whether a product is of interest to the customer. The format for the "time selected" 306 and a "time released" 308" illustrated in FIG. 3 is "hours: minutes: seconds". For example, it may be determined that a customer is interested in a product if the web-page associated with that products is displayed to the customer device 106 for more than a pre-determined amount of time (e.g. 2 seconds). Any time spent viewing a web-page that is less than the pre-determined amount of time may be considered to be casual browsing on the part of the customer.

Other methods for determining and recording the products of interest to a customer during an on-line session will occur to those of skill in the art. For example, the central server 102 may be configured to determined that a customer is interested in a product only upon receiving an input signal to that effect. Upon receiving such an input signal, the central server 102 may record the appropriate product identifier 202 in the session table 300. Examples of input signals that may indicate a customer's interest in a product include: a key word search for the product, an e-mail requesting information relating to a product, a request to download information relating to a product, addition of a product to a virtual shopping cart or other list of products selected for purchase, and the like.

FIG. 4 is an illustrative record 400 of the transaction database 124, as shown in FIG. 1. A transaction record 400 may be used to store transaction data relating to a completed transaction. Transaction data may be received from a customer device 106 or from a point-of-sale terminal 109A, 109B, 109C. Each transaction table 400 may be identified by a unique transaction identifier 402. A transaction table 400 may also include a session identifier 302 identifying a session table 300 (see FIG. 3) from a session database 126. The transaction identifier 402 may be associated with the customer by storing it in association with a customer identifier (e.g. a "cookie" or a frequent shopper identifier) in a record of the customer database 128 (as illustrated in FIG. 5, described below).

A payment identifier 404, such as a credit card number or a financial account number, may also be recorded in the transaction record 400 to identify the customer's financial account that was charged, debited or credited during the initiating transaction. The purchase total 408 representing the total purchase price paid by the customer may also be stored in the transaction record 400. The purchase total of "$307.79" in FIG. 4 is illustrated as comprising the sum of the "price paid" for each of the products included in the transaction plus an exemplary 6.5% sales tax. The transaction record further includes an indication of whether the customer was presented with a package offer during the transaction illustrated in the subject record. Such an indication is stored in the "package offered?" field 410. An indication of whether the package was accepted is stored in field 412. Fields 410 and 412 may be used by the operator of central server 102 to track how many time package offers are presented to and accepted by customers. Such information may be tracked for individual customers by use of the session identifier 302.

The exemplary transaction record 400 stores data objects 417-420 relating to products included in a package that was purchased by a customer. Each data object 417-420 includes, for example, a product identifier 202, a retail price 206 and a price paid 406. If the customer purchased the product as part of a package offer, the price paid 406 may be lower than the retail price 206. Corresponding to each product identifier 202 is an indication of whether the product was purchased as part of an accepted offer. This indication is stored in field 414. An entry of "Y" in field 414 indicates that the corresponding product was purchased as part of an accepted package offer. An entry of "N" in field 414 indicates that the package was not purchased as part of an accepted package offer. An indication of which product was the primary product that triggered the presentation of the package offer to the customer may also be stored in the transaction record 400. Such an indication is illustrated in data object 417, by an entry of "P" in the "package product?" field 414.

The transaction record 400 also stores an indication of the payment status 416 of each product included in the subject transaction. This field may be useful in the physical retail embodiment where a customer may request, be presented with, and accept a package offer at a customer device that is remote to the POS terminal at which he provides payment for the products he is purchasing. In such an embodiment, when a customer accepts a package offer, a transaction record is created and stored, indicating the products included in the transaction that are part of the package offer. The status 416 of the products included in the package may be set to "pending" at this time. A transaction identifier for the transaction may be output to the customer for presentation to the operator of the POS terminal when providing payment for the products. Accordingly, when the customer presents the transaction identifier to the POS operator (who enters it into the POS terminal) the transaction record is retrieved and the appropriate prices for the product, as indicated in the "price paid" field are applied to the transaction total. The package price charged to the customer, as well as the savings that the customer achieved by purchasing the products as a package, may be displayed to the customer at the POS or printed on the customer's receipt. The status of each of the products included in the package, as stored in the record of the transaction database, may be set to "paid" once the customer provides the appropriate payment. If it is determined at the POS that all of the products included in the package offer are not present in the customer's current transaction, the customer may be charged the full retail price for the products that are included in the package offer and included in the current transaction. In one embodiment, another package is dynamically assembled based on the products included in the current transaction and presented to the customer at the POS.

FIG. 5 presents an illustrative record 550 of the customer database 128 of FIG. 1. The record 550 includes a customer identifier 200 that uniquely identifies the customer to which the record pertains. As described above the customer identifier may comprise (i) a frequent shopper identifier in a physical retail environment, or (ii) at least a portion of a "cookie" that is stored on the customer's hard-drive and transmitted to the central server 102 when the customer "loads" a Web-page of the central controller.

The customer record 550 may be used to build a customer profile of the customer identified by customer identifier 200. In accordance with an exemplary embodiment of the present invention, the customer record 550 tracks each of the products that a customer indicated interest in during his past visits to the Web site hosted by central server 102. The customer record 550 comprises data objects 551-556, each storing information regarding a primary product that was determined to be of interest to the customer. Each of such products is identified by product identifier 202 in transaction record 550.

Associated with each product identifier 202 is (i) a date of interest 560, which indicates the date on which the customer exhibited interest in the product; (ii) a purchase status 562, which indicates whether the customer has purchased the product to date; (iii) a package status 564, which indicates whether a package offer that includes the primary product has been offered to the customer and whether it has been accepted by the customer; (iv) a discount 566, which indicates, if a package offer for the product has been presented to the customer, how much of a discount in the retail price of the product (or a combination discount in the sum or retail prices of all of the product in the package) was offered to the customer; (v) a transaction identifier 568 that indicates the transaction in which the purchase of the product was included, if any; and (vi) a session identifier 570 that indicates the session during which the customer indicated interest in the product.

For example, data object 554 indicates that customer "C987654321" indicated interest in product "P199" on May 30, 1999 and was presented with a package offer, at a package price that was 10% less than the sum of the retail prices of the products included in the package, but that the customer declined the package offer. Data object 555 indicates that the same customer indicated interested again in product "P199" on Jun. 2, 1999 and was again presented with a package offer, this time at a package price of 15% less than the sum of the retail prices of the products included in the package. Data object 555 indicates that this time the customer accepted the package offer and the product was purchased by the customer. This may be an indication that the customer was swayed by the higher discount and should be presented in the future with package offers that include at least a 15% discount in the future.

The data stored in customer record 550 is exemplary only. Other variations will be obvious to one of ordinary skill in the art. For example, an indication of the secondary products include in a package offer to the customer may also be stored. Such information may be used to evaluate, for example, whether the customer is more likely to accept a package offer if certain products or types of products are included in the package offer.

Figure 6A:
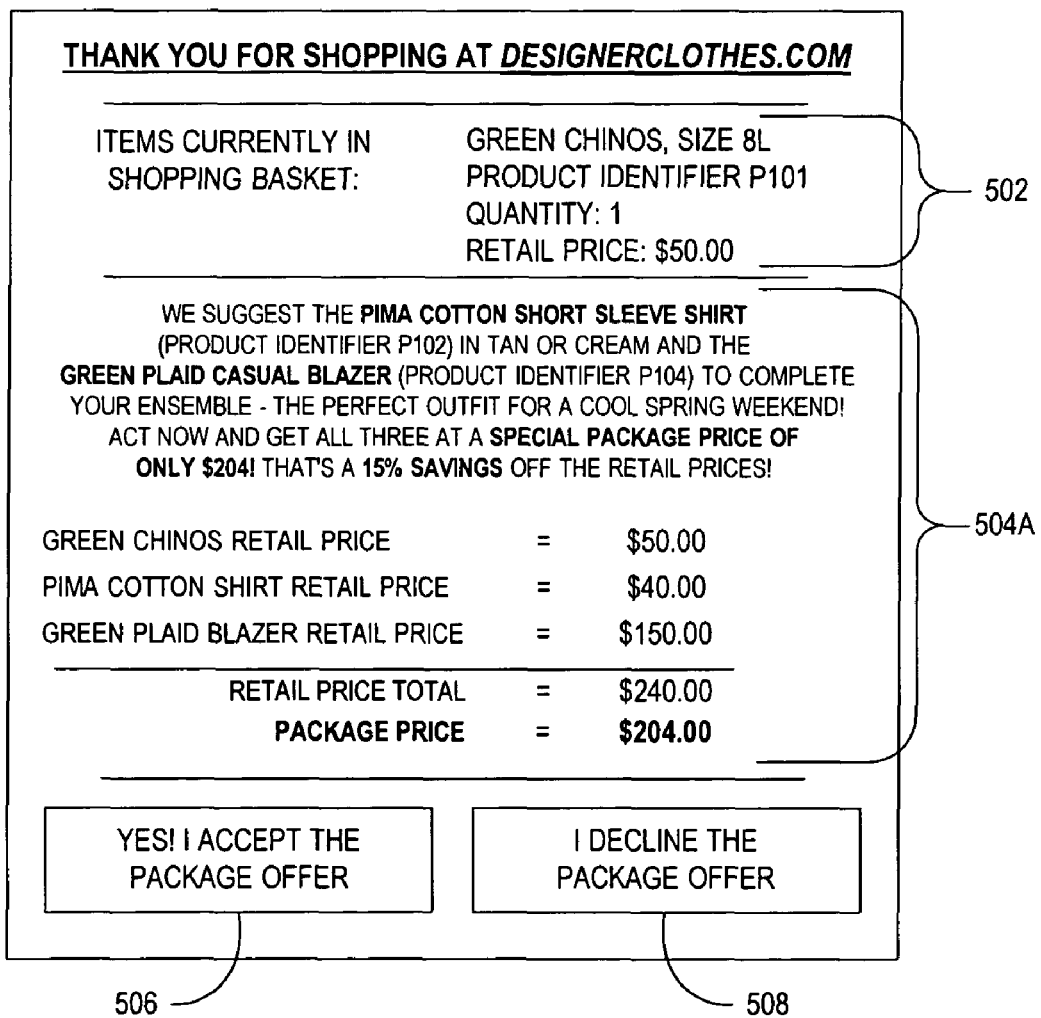
FIGS. 6A and 6B each illustrate an exemplary web-page of a web-site of an on-line retail establishment for presenting a package offer to a customer in accordance with an exemplary embodiment of the present invention.
Figure 6B:
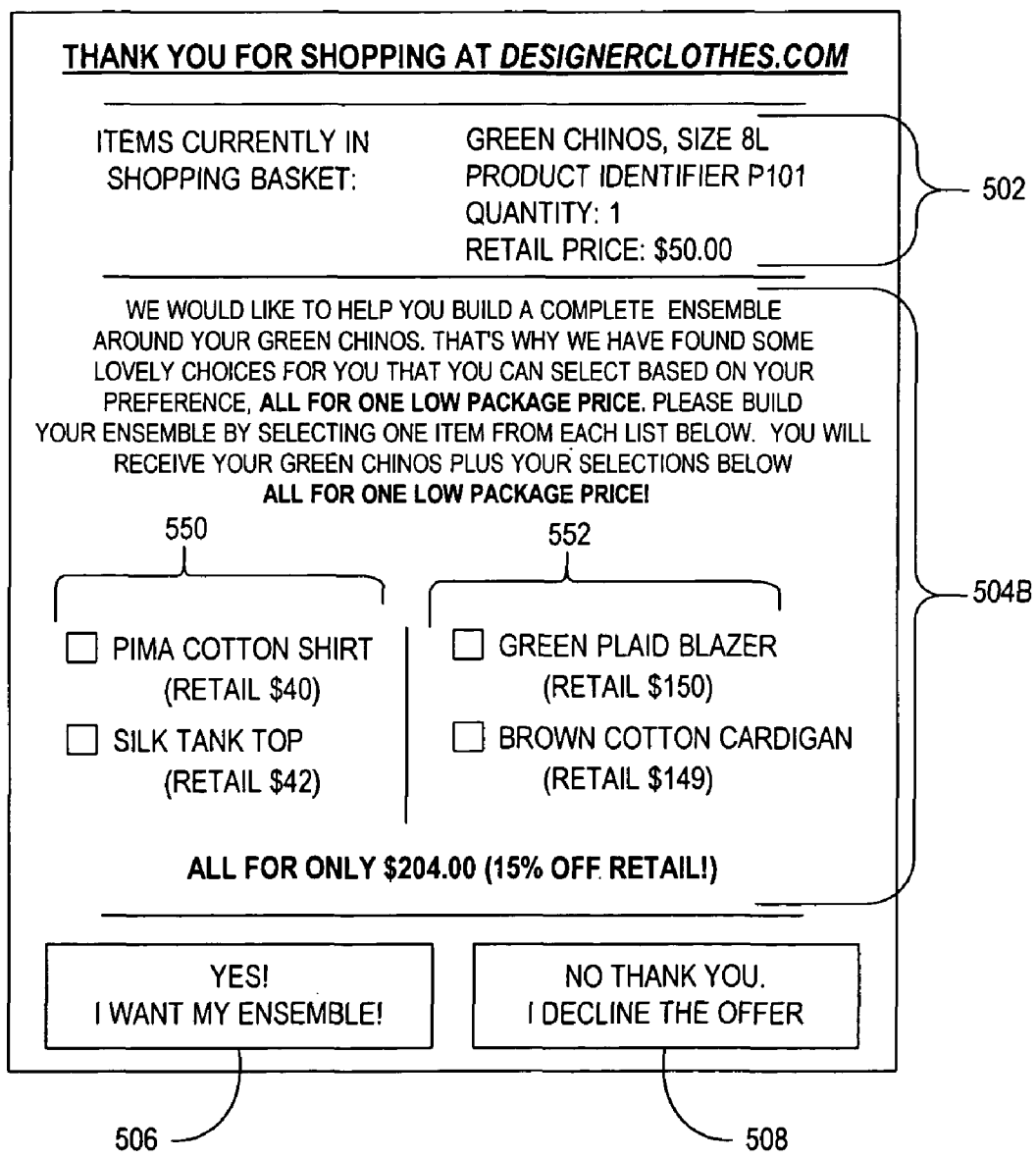

FIG. 6A and FIG. 6B each presents an illustrative web-page of a web-site associated with an on-line retail establishment. Referring now to FIG. 5A, the illustrative web-page 500A demonstrates a manner in which a package offer may be presented to a customer in accordance with one embodiment of the present invention. As shown, web-page 500A may list all items currently in the customer's virtual shopping basket 502. The package offer 504A may be described in a textual passage as well as in a table showing the retail prices for each package product, the sum of the retail prices for the combination of the package products, and the discounted package price. The package offer 504A comprises an offer for three products at a package price that is less than the sum of the retail prices of the three products, wherein one of the three products is the primary product that is of interest to the customer. In the embodiment illustrated in FIG. 6A the primary product is determined to be of interest to the customer because the customer has placed the product into his virtual shopping basket, as indicated by section 502 of the web-page 500A. The products presented to the customer in the package offer 504A may have been retrieved, for example, from a product database 122 such as illustrated by FIG. 2E. Upon being presented with such a package offer 504A, the customer may choose to either accept or decline it. Accordingly, a first selectable graphic 506 may be provided for allowing the customer to accept the package offer 504A. Similarly, a second selectable graphic 508 may be provided for allowing the customer to decline the package offer 504A.

Referring now to FIG. 6B, the web-page 550 demonstrates a manner in which a package offer may be presented to a customer in accordance with another embodiment of the present invention. The web-page 500B includes essentially the same elements 502, 506, and 508 as web-page 500A but package offer 504A has been substituted with package offer 504B. Package offer 504B comprises a package offer in accordance with an embodiment of the present invention wherein the customer is allowed to assemble his or her own package by selecting one product from a plurality of menus that include two or more products each (of course, in variations of this embodiment, the customer may be allowed to select more than one product from each menu). The embodiment illustrated in FIG. 6B is similar to the embodiment illustrated in FIG. 2C. Accordingly, a customer presented with package offer 504B must first select one product from menu 550 and one product from menu 552 before selecting graphic 506 in order to accept the package offer.

The web-pages 500A and 500B are shown by way of example only. Other methods for presenting a package offer via a web-site or other mediums will occur to those of skill in the art.

Figure 7:
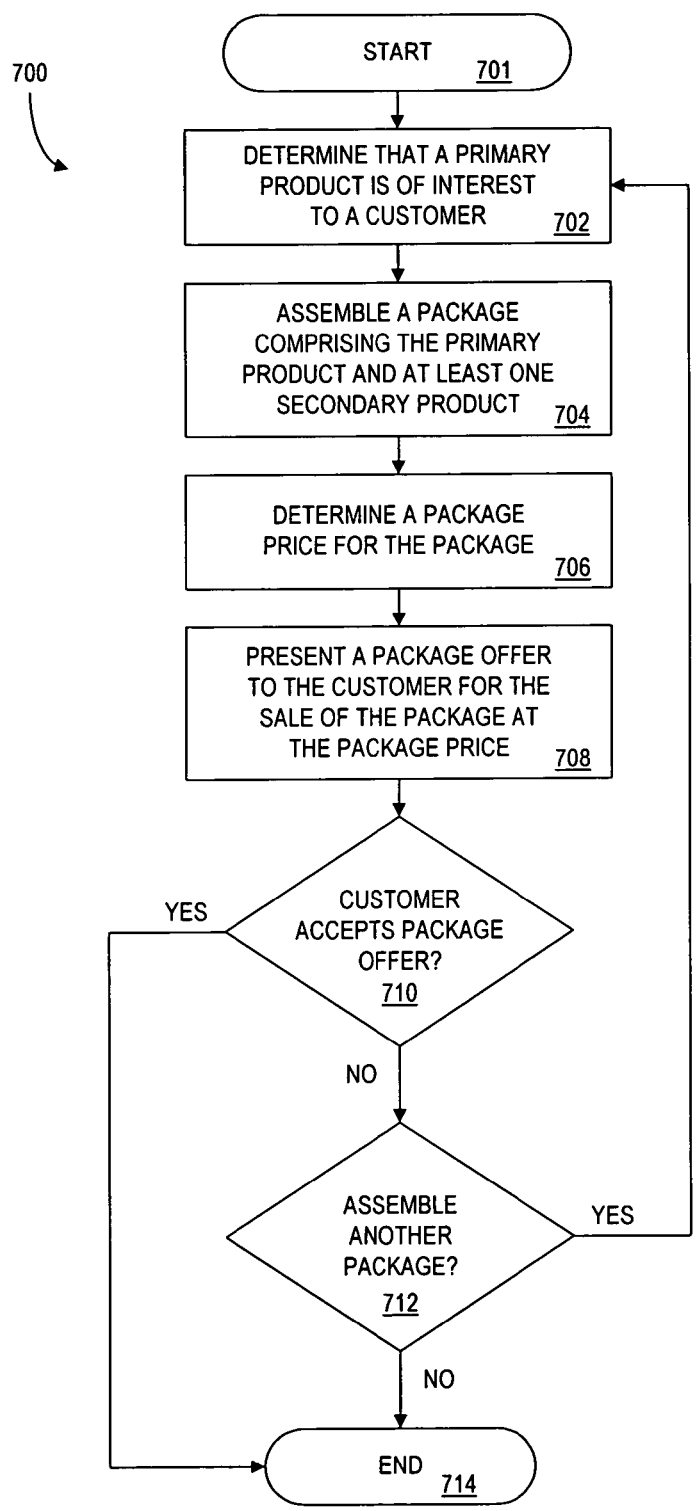
FIG. 7 is a flow chart illustrating the general steps of an exemplary method for presenting a package offer to a customer in accordance with an exemplary embodiment of the present invention.

FIG. 7 is a flow chart illustrating the general steps of an exemplary method 700 for presenting a package offer to a customer. The exemplary method 700 begins at starting block 701 where a customer is interacting with a retail establishment (on-line or physical) via a customer device. At step 702 a determination is made that the customer has expressed an interest in a primary product. Input signals from a customer device 106 may be interpreted by the central server 102 as an expression of interest by the customer in the primary product. Input signals from the customer device 106 may indicate that the customer has clicked on an image or hyperlink associated with a product using a mouse or other input device, that the customer has initiated a keyword search for information relating to a product, or that the customer has added a product to a virtual shopping cart. Other types of input signals will be familiar to those of ordinary skill in the art. In certain circumstances, a lack of an input signal may also be interpreted by the central server 102 as an expression of interest by the customer in a product. By way of illustration, the central server 102 may be configured to infer that a customer is interested in a particular product when the central server 102 detects that information pertaining to the particular product has been displayed on the customer's output device 135 for a predetermined length of time. Accordingly, the central server 102 may be configured to proactively monitor customer interactions with a web-site in an effort to infer that one or more input signals, or a lack thereof, indicate an expression of interest by the customer in a product. Alternatively, the central server 102 may be configured to passively await the transmission of an input signal from a customer device 106 that affirmatively indicates that the customer is interested in a product.

In response to determining that the primary product is of interest to the customer, a package is assembled at step 704 comprising the primary product and at least one secondary product. The secondary product(s) may be selected from a database of available secondary products and by be selected based on a prior expression of interest in the product by the customer, a relationship of the secondary product to the primary product (e.g. the two are associated in a database as complementary), profit margin considerations, etc. Assembly of a package may be performed by the central server 102 configured for execution of a package assembly program module that may be a component of program 116 (FIG. 1A). The program 116 of the central server 102 may be configured to assemble packages on an ad hoc basis or may be configured to access pre-assembled packages stored in the product database 122. Exemplary methods for assembling packages will be discussed in greater detail below with reference to FIG. 8.

Next at step 706 a package price for the package is determined. The package price is preferably less than the sum of the retail prices of each product in the package. The program 116 of the central server 102 may include computer-executable instructions for determining the package price for the package. It should be appreciated that the assembly of a package and the determination of a package price may be interrelated tasks. For example, the program 116 may be configured to offer a customer a package of products having a pre-determined package price. The pre-determined package price may be a specific dollar amount or a pre-defined percentage of the total retail price for the package products. It is likely to be the case that only certain secondary products may be included in the package in order to satisfy the pre-determined package price and allow the on-line retailer to earn an acceptable profit. Exemplary methods for determining a package price are discussed below with reference to FIG. 8.

After the package is assembled and the package price is determined, a package offer is presented to the customer at step 708. A package offer comprises an offer for sale of the package at the package price. In an on-line retail environment, the package offer may be transmitted by the central server 102 to a web-site of the on-line retail establishment for presentation to the customer. The presentation of the package offer may include an input field or a selectable graphic allowing the customer to indicate an acceptance or rejection of the package offer (as illustrated by elements 506 and 508 of FIGS. 6A and 6B). Other methods and interfaces for presenting a package offer to the customer will be apparent to those of ordinary skill in the art and are considered to be within the scope of the present invention. As an example, a package offer may be presented to the user as a "pop-up" graphic on a web-page for a limited period of time. If the user does not indicate an acceptance of the package offer within the limited time duration, the pop-up graphic may be removed from the web-page without any affirmative input from the customer.

Preferably, the package offer is presented to the customer while the customer is considering whether to purchase the primary product. However, the package offer may alternatively be presented to the customer after the customer has purchased the primary product, as an enticement for the customer to spend more money at the on-line retail establishment. Thus, the package offer may be e-mailed or otherwise communicated to the customer even after the customer has logged-off of the web-site associated with the on-line retail establishment. If the customer accepts such an offer, any discount due to the customer as a result of a discount in the retail price of the primary product as included in the package offer may be (i) credited to a financial account associated with the customer, (ii) provided to the customer as credit that is redeemable with the retailer operating the central server 102 for future purchases, or (iii) reflected as a larger discount in the secondary product retail prices of the package offer.

Alternatively, a package offer may be triggered once the customer indicates a loss of interest in a product. Such a loss of interest may be indicated by the customer (i) removing the product from a virtual shopping basket, or (ii) selecting another Web-page or another product without placing the subject product in a virtual shopping basket. Additionally, a customer may be presented with a package offer if he has had a product in his virtual shopping basket for a predetermined amount of time without purchasing it. For example, a customer may be sent an e-mail message that includes a presentation of a package offer (including the product the customer has in his virtual shopping basket for the predetermined amount of time). If the customer has more than one product in his virtual shopping basket for a predetermined amount of time, a package may be assembled using one of the products in the virtual shopping basket as a primary product and at least one other product in the virtual shopping basket as a secondary product.

In a physical retail environment, package offers may be presented to the customer in similar manners via a customer service device. A customer service device may optionally include an input device for allowing the user to generate an input signal indicating a acceptance or rejection of a package offer.

At step 710 a determination is made as to whether the customer accepts the package offer. If the customer does not accept the package offer, a determination is made at step 712 as to whether another package should be assembled. The determination of whether to assemble another package may be based on many factors, such as whether any other packages make sense for the retailer (based on inventory and/or profitability considerations), whether a certain number of packages have been declined by the customer, whether the customer has indicated a desire not to be presented with further packages, etc. If a decision is made to assemble another package, the exemplary method 700 may be repeated from step 702, where another primary product that is of interest to the customer is determined. Alternately, the method 700 may be repeated from step 704 in order to assemble another package based on the initial primary product. As shown, the exemplary method 700 ends at step 714 after it is determined at step 710 that the customer has accepted a package offer or after it is determined at step 712 that no further package is to be assembled. Those skilled in the art should recognize that exemplary method 700 may be repeated during a session. In other words, the customer is not required to complete all transactions and log-off or exit the retail establishment upon accepting a package offer. The customer may accept more than one package offer during a session and may complete any or all transactions at any time during the session.

If the customer indicates an acceptance of the package offer, the transaction may be completed via the web-site in a customary manner. For example, the customer may input a credit card number or other payment identifier to the web-site. The central server 102 or other server hosting the web-site may be in communication with a financial institution for the purpose of completing transactions. Completing a transaction may comprise charging, debiting or crediting a financial account identified by the customer. Alternately, the central server 102 or other server hosting the web-site may be in communication with a point-of-sale terminal at a physical retail establishment for the purpose of completing transactions.

After the transaction is complete, the central server 102 may be configured to arrange for shipment of the package products to the customer. By way of illustration, the central server 102 may be configured to automatically generate a shipping order that is transmitted to a shipping department of the retailer. Delivery of the package products to the customer may be accomplished in any well-known manner. In one embodiment, the customer may elect or be required to appear at a physical retail establishment, warehouse or distribution center to obtain the package products.

In a physical retail environment, an input device of a customer service device may also allow the customer to enter a payment identifier that may identify a financial account to be charged, debited or credited in the amount of the package price or may identify another form of payment such as electronic currency (e.g. e-cash).

However, in the physical retail environment payment of the package price will preferably be accomplished at a point-of-sale terminal 108 that may be separate from the customer device 106 at which the customer is presented with, and accepts, a package offer. In an illustrative embodiment, the customer may be presented with a customer identifier, such as a personal identification number (PIN) or other type of code, upon accepting the package. The customer device 106 may display the customer identifier to the customer via a display device. Alternately, the customer device 106 may be equipped with a printer for printing a coupon or other voucher-type paper that includes the customer identifier. This coupon may further include an indication of the products included in the package price (e.g. the description and SKU of each product included in the package). The customer identifier may optionally be in the form of a barcode or any other form of machine readable indicia that is to be input into the point-of-sale terminal 108 by way of a scanner. In a "frequent shopper club" embodiment, a "frequent shopper ID" previously provided to the customer may serve as the customer identifier.

The customer identifier may also be stored by the central server 102 in association with the customer's transaction record in the transaction database 124. The customer identifier may subsequently be presented by the customer to the operator of a point-of-sale terminal 108. The point-of-sale terminal 108 may then transmit the customer identifier to the central server 102 for retrieval of the customer's record from the transaction database 124. As will be apparent, the point-of-sale terminal 108 may include an input device, such as a scanner, to receive the product identifiers from the products that the customer believes to be included in the package.

After indicating an acceptance of a package offer and receiving a customer identifier, the customer may obtain what he or she believes to be the package products and proceed to the point-of-sale terminal for completion of the transaction. The point-of-sale 108 terminal may communicate with the central server 102 to retrieve the customer's accepted package price from a transaction database 124 and to charge the customer appropriately. The point-of-sale terminal 108 may compare the product identifiers of the products obtained by the customer with the product identifiers stored in the transaction database 124 in association with the package offer. Upon verification that the customer has obtained each product included in the package, the package price may be charged to the customer.

Figure 8A:
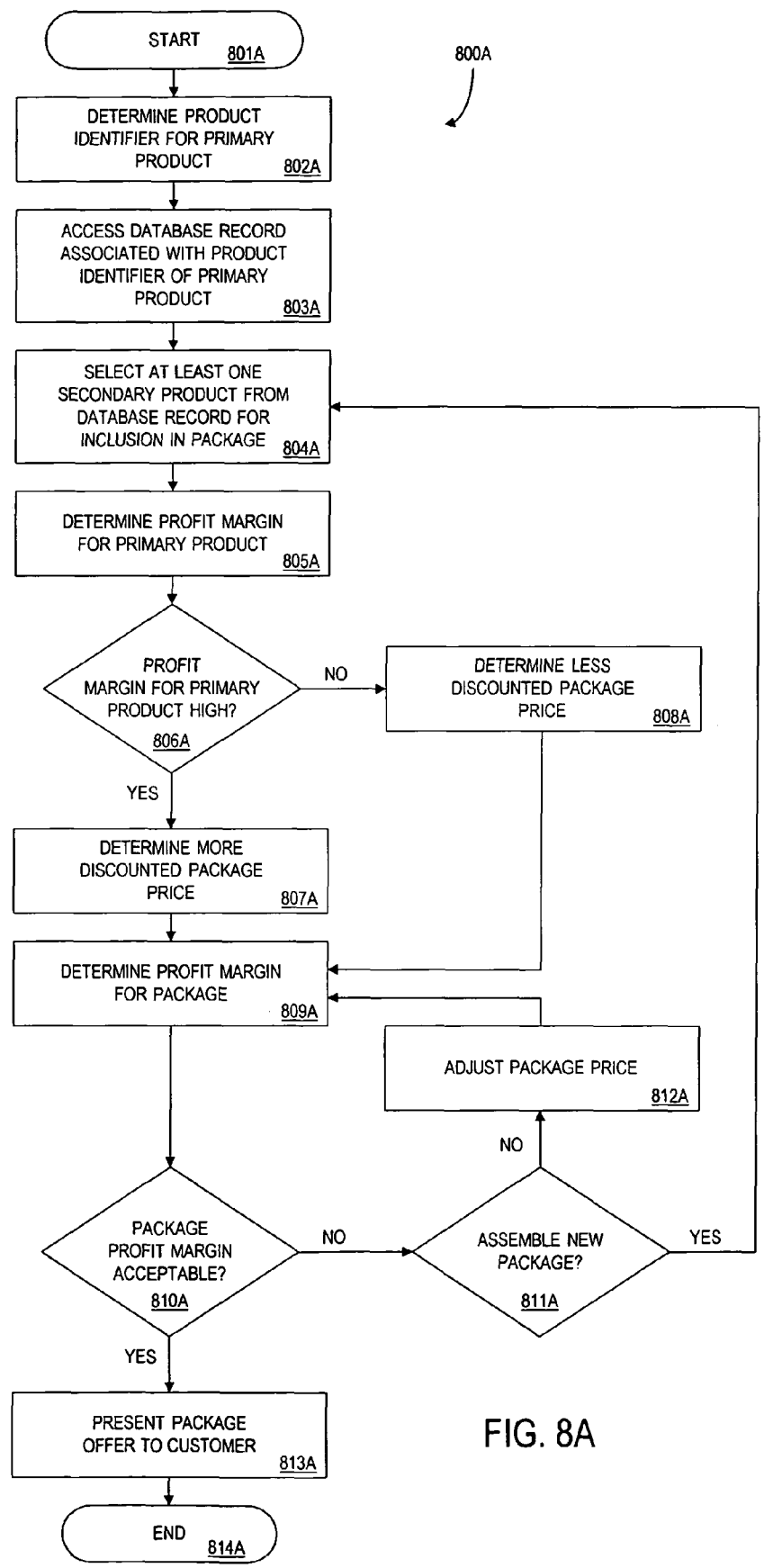
FIG. 8, comprising FIG. 8A, FIG. 8B, FIG. 8C and FIG. 8D, provides flow charts illustrating exemplary methods for assembling package offers in accordance with an exemplary embodiment of the present invention.

FIG. 8, comprising FIG. 8A, FIG. 8B, FIG. 8C and FIG. 8D, provides flow charts illustrating exemplary methods for assembling package offers in accordance with an exemplary embodiment of the present invention. FIG. 8A demonstrates an exemplary method 800A for assembling a package offer through use of a product database 122, such as exemplary product database 122A of FIG. 2A. The exemplary method 800A begins at starting block 801A, where a primary product has been determined to be of interest to a customer. At step 802A, the product identifier for the primary product is determined. Then at step 803A, the database record associated with the product identifier of the primary product is accessed. The database record associated with the product identifier of the primary product stores financial information pertaining to the primary product, such as the cost to the retailer of the primary product, the retail price of the primary product and the minimum price at which the retailer is willing to sell the primary product.

At step 804A, at least one secondary product is selected for inclusion in the package. Preferably, the secondary product(s) are selected based on a prior expression of interest by the customer. The product database 122 may store only those products that were previously of interest to the customer. Alternately, a session database 126 (see FIG. 1A) may store such information and selection of the secondary products may be performed based on cross-reference to the session database for a determination of secondary products in which the customer has expressed an interest.

In another embodiment, selection of the secondary products may be based on cross-reference to a product database such as illustrated by product table 122E (FIG. 2E) which may store pre-determined or dynamically determined associations between the primary product and one or more secondary products. For example, with specific reference to FIG. 2E, the product database 122E specifies that if a product having product identifier "P198" is determined to be the primary product, the products having product identifiers "P104" and "P119" are to be selected as the secondary products and the three products presented to the customer for a package price of "$300.00", as depicted in record 210E. As a specific illustration, if a red scarf is determined to be the primary product of interest to the customer, an entry in the product table 122E may specify that the secondary products to be selected for the package are a matching pair of red gloves and a red hat. Other methods for selection of secondary products will occur to those of ordinary skill in the art.

Next at step 805A, the profit margin for the primary product is determined based on the retail price and the cost of the primary product (e.g. profit margin=retail price−cost). In one embodiment of the present invention, the selection of the secondary products to be included in the package with the primary product is based on the profit margin of the primary product. For example, if the primary product has a high profit margin, secondary products with relatively low profit margins may be included in the package offer because the high profit margin of the primary product may be used to fund the overall discount of the package price as compared to the sum of the retail prices of the primary product and the secondary product(s).

For example, a primary product may be a dress that has a profit margin of $50 (e.g. retail price of dress=$150, and the cost of the dress=$100). The central server 102 may thus include a relatively low margin product, such as a scarf that has an associated profit margin of $5 (e.g. retail price of scarf=$50, and cost of scarf=$45). Due to the high margin of the dress, the package of the dress and the scarf may be offered at an attractively discounted price of $170. The package price of $170 is 15% less than $200, the sum of the retail prices for the dress and the scarf ($150+$50=$200). If the primary product had not been a high margin product, the retailer may have been unwilling to offer such a high discount due to an unacceptably low overall profit margin for the contents of the package. In the above example, the retailer earns a $30 overall profit margin on the contents of the package, referred to herein as a package profit margin ($175 (package price)−$100 (cost of dress)−$45 (cost of scarf)=$30). If, however, the margin of the dress had only been $15 (e.g. the cost of the dress in the above example=$135), the retailer would have suffered a loss of $5 on the package if he had offered it to the customer for the package price of $170 ($170 (package price)−$135(cost of dress)−$45(cost of scarf)= −$5). The retailer may find such a loss unacceptable. In order to prevent such a loss the retailer may (i) determine a lower discount (e.g. less than 15% in the above example), or (ii) select a secondary product with a higher profit margin and attempt to assemble another package at the relatively higher discount (e.g. 15%).

Also, the retailer may wish to earn a minimum package profit margin on each package offer. For example, the retailer may set a minimum profit margin for a package price at a predetermined amount (e.g. $10) or at a predetermined percentage of the sum of the profit margins for the primary and secondary products included in a package offer (e.g. 50%). As an example of the latter, a profit margin for a primary product is $50, a profit margin for a first secondary product is $10, and a profit margin for a second secondary product is $20. The sum of the profit margins for the primary product and the two secondary products is $80 ($50+$10+$20=$80). The retailer has set the minimum package profit margin at 50% of the sum of the profit margins of the products included in the package based on the retail price of each product. Thus, in order for the three products above to be offered in a package, the package profit margin has to be $40 or more. Accordingly, in such an embodiment, the central server 102 may take the profit margin of the primary product and the secondary product(s) into account when assembling a package and determining a package price.

In still another illustrative embodiment, selection of secondary products for inclusion in a package may be based entirely on criteria for profitability. Based on products available in inventory, the central server 102 may attempt to assemble a package that provides a particular discount level to the customer while yielding a certain profit margin for the retailer. In one embodiment of the present invention, the retailer may wish to include products that are distressed (e.g. have not been selling well or are about to expire) in a package. In such a case, the retailer may offer a very high discount on the secondary product because any price received as a result of the distressed product being sold as part of a package may be more profitable than letting the product sit on the shelf longer and/or expire. Such distressed products may be flagged in an inventory database and selected by the central server 102 for inclusion in a package. The secondary products selected for the package may have no relationship to the primary product other than a monetary relationship. For example, if a primary product of interest to a customer is a television, the secondary products included in the package may be a shovel and a sweater, which were selected based entirely on profit margin considerations. However, as will be appreciated by those of skill in the art, a package offer is more likely to be accepted by a customer if the package includes products that are known to be of interest to the customer. Therefore, assembly of packages based entirely on economic considerations may not be practical.

At step 806A, it is determined whether the profit margin for the primary product is high. Of course, the definition of a high profit margin is relative. For example, a retailer may set a threshold amount at or above which the profit margin is to be considered high and below which the profit margin is considered to be low. The threshold amount may alternatively be a threshold percentage of the sum of the costs of the products included in the package. In an illustrative embodiment, the criteria for determining whether a profit margin is high may be customer-specific. In other words, the retailer may be willing to realize less of a profit margin on package sales to regular or preferred customers, as compared to infrequent customers. Furthermore, the retailer may determine that a particular customer has historically accepted packages offers that provide a certain percentage discount and may attempt to assemble a package having a package price that provides that percentage discount. Data pertaining to historical transactions may be stored in a transaction database 124 or a customer database 128 (as shown in FIG. 1A and illustrated in FIG. 4 and FIG. 5).

If the profit margin of the primary product is determined to be sufficiently high, a more deeply discounted package price is calculated at step 807A. If the profit margin of the primary product is not sufficiently high, a less discounted package price is determined at step 808A. Again, the retailer may set a threshold percentage (e.g. 15%) off of the sum of the retail prices of the products included in the package at or above which a package price is to be considered a more discounted package price and below which a package price is to be considered a less discounted 320 package price. Alternatively, rather than setting a threshold amount or percentage, the retailer may set a range of acceptable amount or percentages within which the package profit margin is to be considered acceptable (e.g. 10%-25%), rather than high or low. After calculation of the package price, the profit margin for the package is calculated at step 809A by subtracting the cost of each package product from the package price. At step 810A, a determination is made as to whether the profit margin of the package is acceptable to the retailer. If the profit margin is not acceptable to the retailer, a decision to assemble a different package may be made at step 811A. If a new package is to be assembled, the exemplary method 800A is repeated from step 804A, where another at least one secondary package is selected. However, if it is decided at step 811A not to assemble a new package, the package price for the existing package is adjusted (e.g. increased by a predetermined percentage or amount) at step 812A. From step 812A, the exemplary method 800A is repeated from step 809A, where the profit margin of the package is calculated based on the adjusted package price. When a package is finally assembled having an acceptable package price, the method advances from step 810A to step 813A, where the package offer is presented to the customer. The exemplary method 800A then ends at step 814A.

Figure 8B:
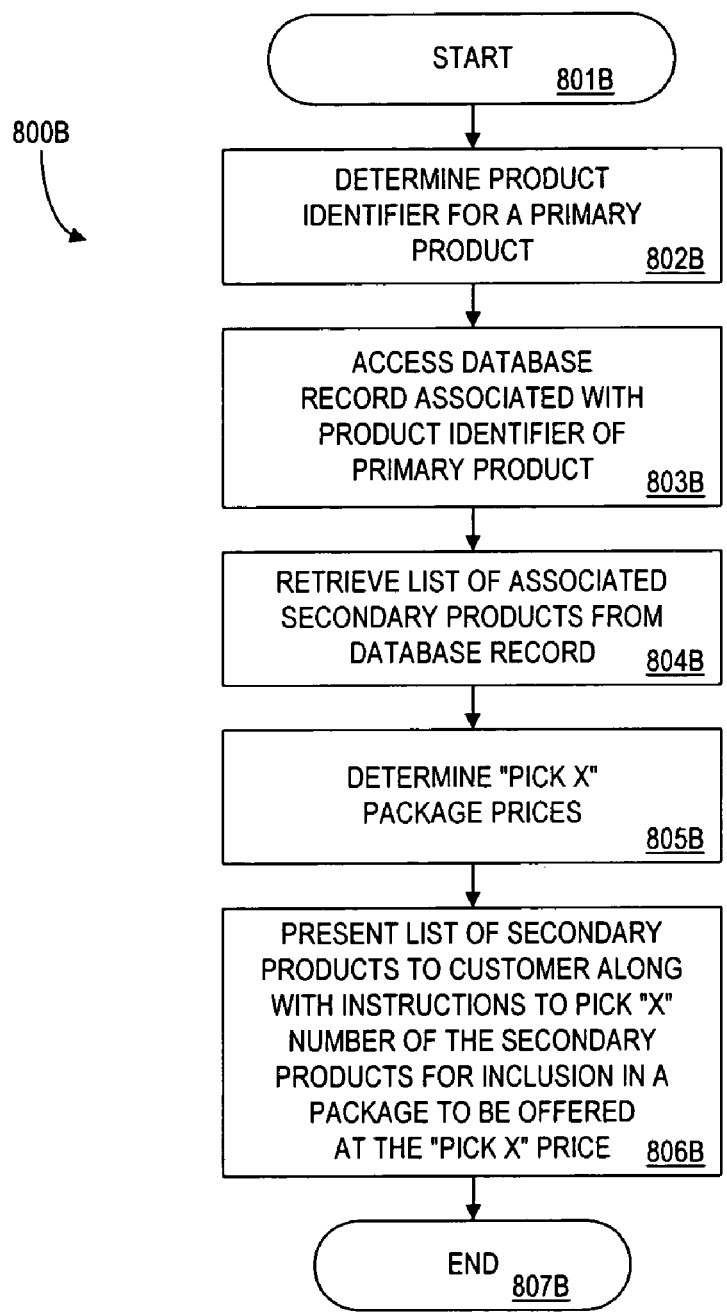

FIG. 8B demonstrates an exemplary method 800B for assembling a package offer through use of a product database 122, such as exemplary product database 122B of FIG. 2B. The exemplary method 800B begins at starting block 801B, where a primary product has been determined to be of interest to a customer. At step 802B, the product identifier for the primary product is determined. Then, at step 803B, the database record associated with the product identifier of the primary product is accessed. The database record associated with the product identifier of the primary product stores a list of associated secondary products. At step 804B, the list of secondary products associated with the primary product is retrieved from the database record. At step 805B a plurality of "pick X" package prices are determined, corresponding to the package price if the customer selects "X" number of the associated secondary products from the list. For example, a "pick one" package price corresponds to the package price if the customer selects one secondary product to be included in a package along with the primary product. Likewise, a "pick two" package price corresponds to the package price if the customer selects two of the associated secondary products from the list. Any number of "pick X" package prices may be determined, limited only by the number of associated secondary products in the list. Those skilled in the art should recognize, however, the pre-determined list of associated secondary products is not required. The list of associated secondary products may alternately be created ad hoc and may include any number of secondary products. Determination of the "pick X" package prices may be performed ad hoc, or may be performed by retrieving predetermined "pick X" package prices from the database record associated with the product identifier of the primary product. At step 806B multiple secondary products from the list of associated secondary products are presented to the customer along with instructions that the customer is permitted to select up to "X" number of the secondary products for inclusion in a package offered at the corresponding "pick X" package price. The exemplary method 800B then ends at step 807B.

Figure 8C:
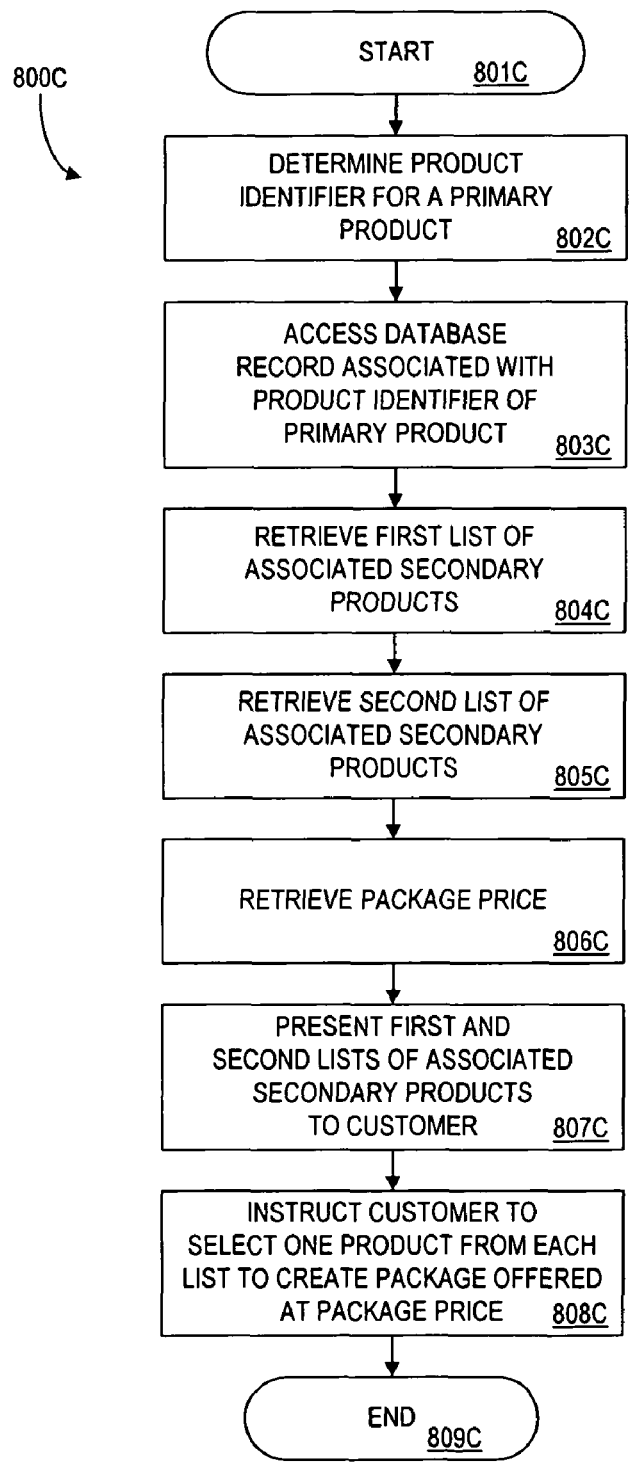

FIG. 8C demonstrates an exemplary method 800C for assembling a package offer through use of a product database 122, such as exemplary product database 122C of FIG. 2C. The exemplary method 800C begins at starting block 801C, where a primary product has been determined to be of interest to a customer. At step 802C, the product identifier for the primary product is determined. Then at step 803C, the database record associated with the product identifier of the primary product is accessed. The database record associated with the product identifier of the primary product stores a plurality of lists of associated secondary products and a package price. For brevity, the present example will be limited to a first associated secondary product list and a second associated secondary product list. At step 804C, the first list of secondary products associated with the primary product is retrieved from the database record. At step 805C the second list of secondary products associated with the primary product is retrieved from the database record. At step 806C the package price is retrieved from the database record. Then at step 807C the first and second lists of associated secondary products are presented to the customer. At step 808C, the customer is instructed that he or she may select one secondary product from each list of associated secondary products for inclusion in a package along with the primary package. The package will be offered for sale at the package price for which ever products are selected by the customer. The exemplary method 800C then ends at step 809C. Although the customer was instructed to pick one product from each presented list, it should be understood that the customer could be instructed to select more than one product from at least one of the lists.

Figure 8D:
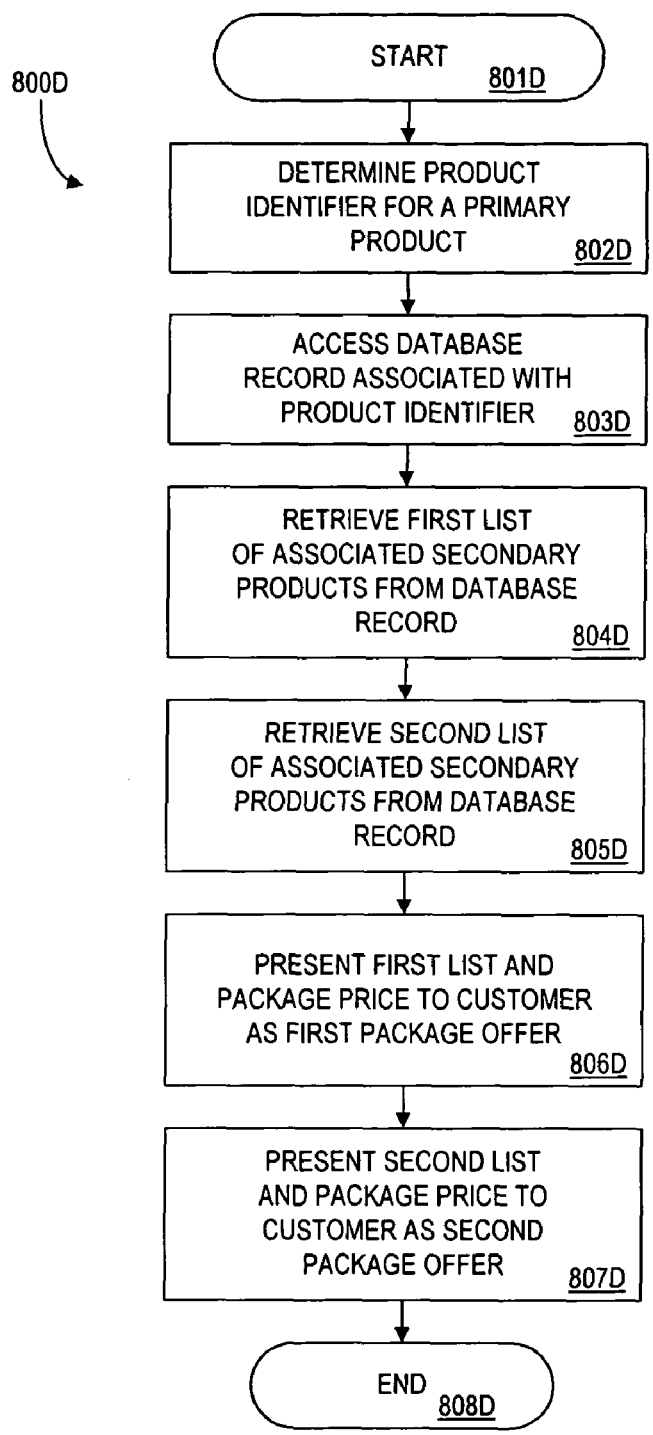

FIG. 8D demonstrates an exemplary method 800D for assembling a package offer through use of a product database 122, such as exemplary product database 122D of FIG. 2D. The exemplary method 800D begins at starting block 801D, where a primary product has been determined to be of interest to a customer. At step 802D, the product identifier for the primary product is determined. Then, at step 803D, the database record associated with the product identifier of the primary product is accessed. The database record associated with the product identifier of the primary product stores a plurality of lists of associated secondary products and a plurality of corresponding package prices. For brevity, the present example will be limited to a first associated secondary product list, a corresponding first package price, a second associated secondary product list and a corresponding second package price. At step 804D, the first list of secondary products and the corresponding first package price associated with the primary product are retrieved from the database record. Similarly, at step 805D the second list of secondary products and the corresponding second package price associated with the primary product are retrieved from the database record. At step 806D the first list of secondary products is presented to the customer for inclusion in a first package, along with the primary product, offered for sale at the first package price. At step 807D the second list of secondary products is presented to the customer for inclusion in second a package, along with the primary product, offered for sale at the second package price. The exemplary method 800D then ends at step 808D.

Figure 9:
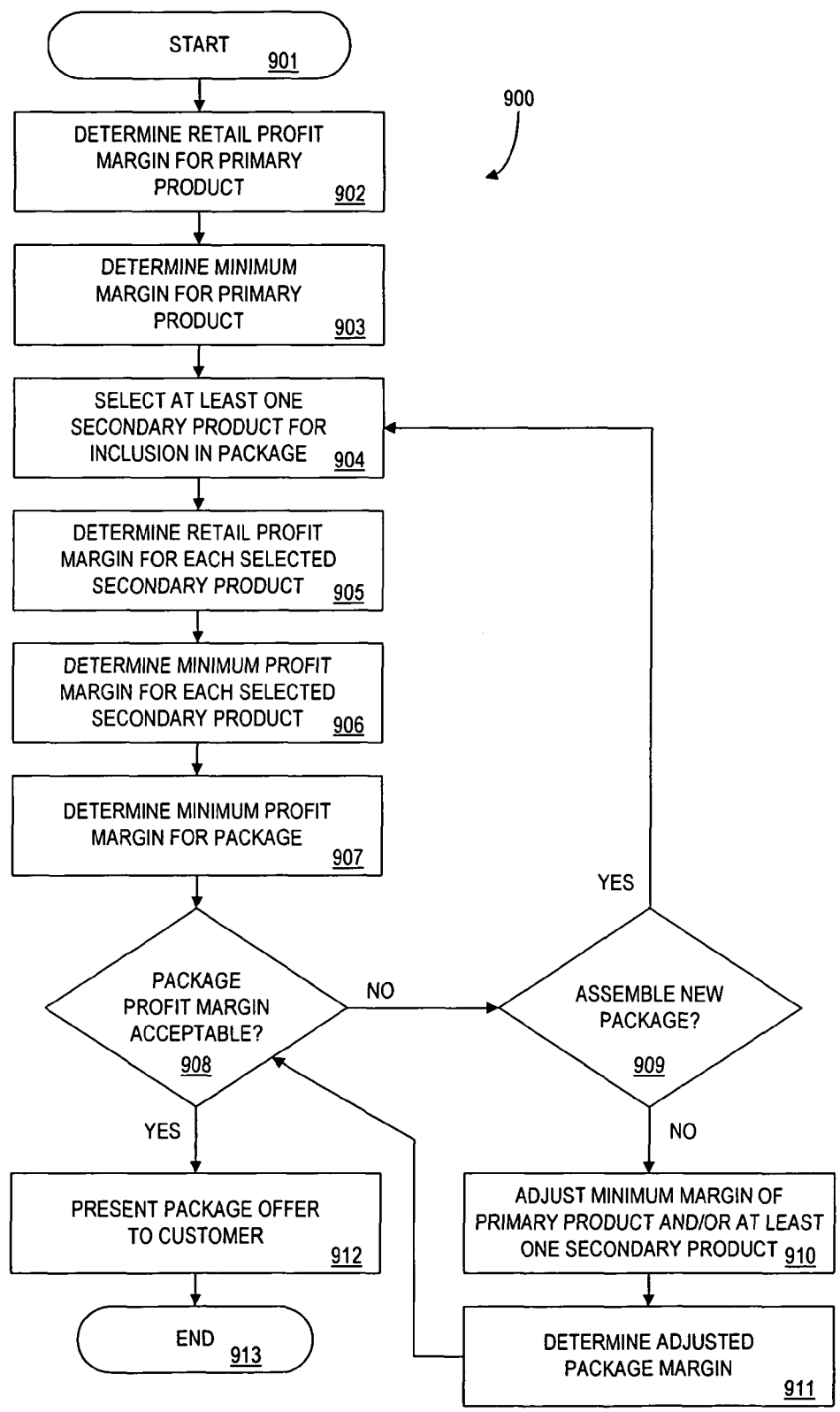
FIG. 9 is a flow chart illustrating an exemplary method for determining a package price in accordance with an exemplary embodiment of the present invention.

FIG. 9 is a flow chart illustrating an exemplary method for determining a package price in accordance with an exemplary embodiment of the present invention. The method 900 begins at starting block 901, where a primary product is determined to be of interest to a customer. At step 902, the retail profit margin for the primary product is determined based on the difference in the retail price of the primary product and the cost of the primary product.

Next, at step 903, the minimum profit margin for the primary product is determined. The minimum profit margin corresponds to the difference in the minimum price at which the retailer is willing to sell the primary product an the cost of the primary product. At step 904 one or more secondary products are selected for inclusion in the package. Selection of the secondary products may be based on the retail margin or the minimum margin of the primary product. In other words, if the retail margin or the minimum margin for the primary product is high, more expensive secondary products may be selected for inclusion in the package. Other manners of selecting secondary products for inclusion in a package have been discussed herein. Still other methods for selecting secondary products for inclusion in a package will be apparent to those of ordinary skill in the art. At step 905, the retail profit margin for each secondary product selected for inclusion in the package is determined. At step 906, the minimum profit margin for each secondary product included in the package is determined. Then at step 907, the minimum profit margin for the package is determined by summing the minimum profit margin for the primary product and each minimum profit margin of the secondary products included in the package.

At step 908, a determination is made as to whether the minimum package profit margin is acceptable. If the minimum package profit margin is not acceptable, a decision may be made at step 909 to discard the present package and assemble a new package. If it is decided to assemble a new package, the exemplary method 900 is repeated from step 904, where a new set of secondary products are selected for inclusion in the new package. However, if it is decided not to assemble a new package, the minimum profit margin of the primary product and/or one or more of the secondary products included in the package is adjusted at step 910. To adjust the minimum profit margin for a product, a new price for that product is selected that falls between the retail price and the minimum price for that product. After adjustment of the minimum profit margin of the primary product and/or one or more of the secondary products, the adjusted package profit margin is calculated at step 911. From step 911, the method 900 is repeated from step 908, where it is determined if the package profit margin is acceptable. When a package is finally determined having an acceptable profit margin (e.g. a profit margin above a predefined amount or percentage or within an acceptable amount or percentage range), the package offer for sale of the package at the package price is presented to the customer at step 912. The exemplary method 900 then ends at step 913.

Figure 10A:
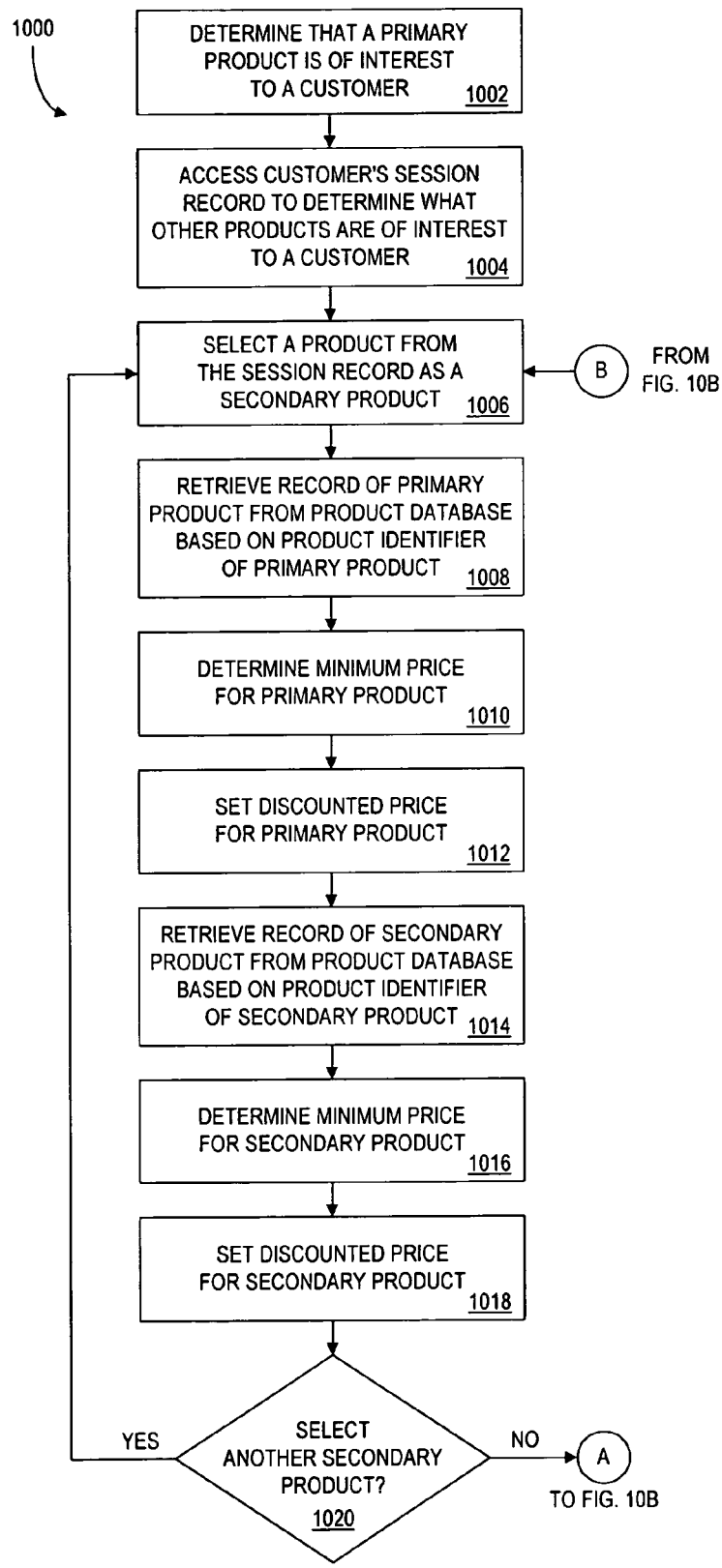
FIGS. 10A and 10B are a flow chart illustrating an exemplary method for determining a package offer in accordance with an embodiment of the present invention.
Figure 10B:
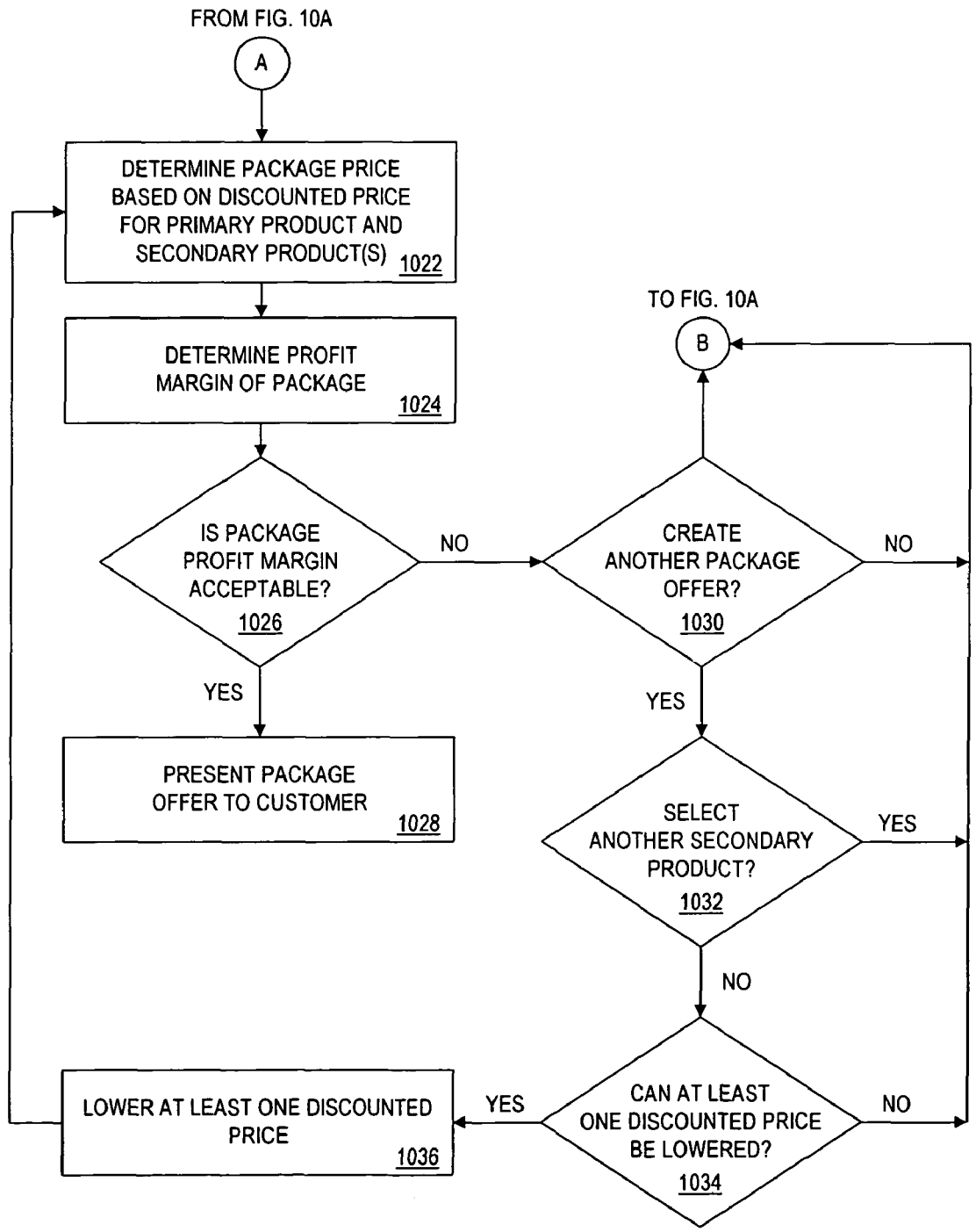

FIG. 10A and FIG. 10B are a flow chart illustrating an exemplary method for determining a package offer to present to a customer in response to the customer's interest in a primary product, in accordance with an exemplary embodiment of the present invention. The process 1000 of FIGS. 10A and 10B is discussed with illustrative reference to product table 122A (FIG. 2A) and session record 300 (FIG. 3).

The process 1000 of FIGS. 10A and 10B begins at step 1002, where it is determined that a primary product is of interest to a customer. Various methods of determining that a product is of interest to a customer, and should therefore be considered a primary product in accordance with this invention, are discussed above. In response to the determination that a primary product is of interest to a customer, the session record of the customer that has indicated the interest in the current product is accessed in step 1004, in order to determine whether there are any other products the customer has indicated interest in earlier in the session. For example, referring to session record 300, if it is determine that product "P122" is the primary product, the session record 300 indicates, in data object 312, that product "P102" is also of interest to the customer, since the customer had previously selected it. It should be assumed, for purposes of the present example, that if a the elapsed time between the "time selected" 306 and "time released" 308 corresponding to a product in the session record 300 is at least two seconds, the product should be considered of interest to the customer. Referring again to FIG. 10A, at step 1006, a product from the session record is selected as a secondary product to be included in a package offer with the primary product. In the example discussed above with reference to session record 300, product "P102" is selected as the secondary product.

Referring again to FIG. 10A, at step 1008, the record of the primary product is retrieved from the product database based on the product identifier. In the current example, product "P122" is considered the primary product. Therefore, the record 217A of product "P122" is retrieved from product table 122A, for the purposes of the example. At step 1010, the minimum price for the product is determined. Such a determination may be made based on, for example, a minimum profit margin set by the retailer. Alternatively, such a determination may be made by retrieving the minimum price associated with the primary product directly from the product database. Again referring to product table 122A as an example, record 217A indicates that the minimum price for product "P122" is "$32.00". Referring again to the process 1000, a discounted price for the primary product is set at step 1012, based on the minimum price. In the current example, the system will set the discounted price, as to be included in the package, at $32.00, the minimum price. Alternatively, the discounted price may be set at any price not greater than $35.00 (the retail price) and not less than $32.00 (the minimum price).

Referring again to process 1000, the record of the secondary product (determined in step 1006) is retrieved from the product database 122 in step 1014 and the minimum price for the secondary product is determined in step 1016. Referring again to the example using the product table 122A, the secondary product "P102" has an associated minimum price of $34.00, as indicated by record 212A. Returning to process 1000, the discounted price, as to be included in the package price, is determined for the secondary product in step 1018. The discounted price may be based on, for example, the minimum price and the retail price and any other rules set by the retailer. An example of such a rule may be that the discounted price should be set half-way between the retail price and the minimum price for the secondary product for an initial attempt to calculate an acceptable package price. Thus, in the current example, the discounted price for product "P102" is set at $37.00.

Returning to process 1000, a determination of whether another secondary product should be selected is made at decision block 1020. Such a determination may be made, based on, for example, whether the retailer has set a minimum or maximum number of products to be included in a package. Alternatively, such a determination may be made based on an evaluation of the package profit margin based on the current products in the package. For example, if the package profit margin is unacceptably low, another secondary product may be selected (maybe a relatively high profit margin secondary product) in an attempt to obtain an acceptable package profit margin. If, at decision block 1020, it is determined that another secondary product is to be selected, the process loops back to step 1006. If, at decision block 1020, it is determined that another secondary product is not to be selected, the process continues to step 1022. For the sake of the current example, it is assumed that the retailer set a maximum number of products in a package at two so another secondary product is not selected.

At step 1022, the package price is determined based on the discounted prices set in steps 1012 and 1018. In the current example, the package price is determined to be $69.00 ($32.00 for the primary product "P122"+$37.00 for the secondary product "P102"). At step 1024, the profit margin of the package is determined. The package profit margin, as determined above, is determined by subtracting the cost of each product included in the package from the package price. In the current example the cost associated with the primary product "P122", as indicated by record 217A of product table 122A, is $30.00. The cost associated with secondary product "P102", as indicated by record 212A of product table 122A, is also $30.00. Therefore, the package profit margin is $9.00 ($69.00−$30.00−$30.00=$9.00). Another way of looking at the profit margin is that it is 15% of the sum of the cost of the products included in the package ([$9.00/($30.00+$30.00)]*100=15%).

At decision block 1026, it is determined whether the package profit margin is acceptable. As discussed above, a retailer may set a minimum profit margin or a range of acceptable profit margins, in the form of a dollar amount or a percentage. If, at decision block 1026 it is determined that the profit margin is acceptable, the process 1000 continues to step 1028. At step 1028, the package offer comprising the primary product determined in step 1002 and the secondary product(s) selected in step 1006 are presented to the customer for the package price determined in step 1022. Of course, other information, such as descriptions or images of the products included in the package could also be presented to the customer as part of the package offer. For the sake of the current example, it is assumed that 15% is an acceptable package profit margin.

If, at decision block 1026, it is determined that the package profit margin is not acceptable, the process continues to decision block 1030. At decision block 1030 it is determined whether another package offer should be created. Creating another package offer may comprise determining another package price for the primary product and the secondary product(s) defining the package offer. Creating another package-offer may also comprise selecting another secondary product to be included in the package in addition to or instead of at least one secondary product currently included in the package.

If, at decision block 1030, it is determined that another package offer should not be created, the process 1000 may end. It may be determined that another package offer should not be created if, for example, there are no other secondary products available (e.g. there are no other products other than the ones already selected store in the session record being used to create the current package) and/or if the discounted prices for the products included in the package were already set to the minimum prices for the products. If, at decision block 1030, it is determined that another package offer should be created, the process 1000 continues to decision block 1032.

At decision block 1032 it is determined whether another secondary product should be selected. If another secondary product is to be selected, the process 1000 loops back to step 1006. A retailer may set preferences regarding whether, in creating another package offer, (i) the currently selected secondary product(s) should be deselected and another secondary product selected, (ii) another secondary products should be selected in addition to the currently selected secondary product(s), or (iii) the discounted prices for the currently selected secondary products should be decremented. Based on such preferences, if at decision block 1032 it is determined that another secondary product should not be selected, the process 1000 continues to decision block 1034.

At decision block 1034 it is determined whether at least one of the discounted prices for the products included in the package can be lowered. Such a determination may be made by comparing the discounted price of each product in the package to the minimum price associated with the product. If the discounted price of at least one product is greater than the minimum price for the product, then the discounted price can be lowered. The discounted price can be lowered by a predefined dollar amount or percentage such that it is not lower than the minimum price for the product. If, at step 1034, it is determined that the discounted price for at least one product can be lowered, then the process 1000 continues to step 1036, where the at least one discounted price is lowered. Once the discounted price is lowered, the process loops back to step 1022, where the package price is once again determined based on the discounted prices of the products included in the package, at least one of which has just been lowered. If, at decision block 1034, it is determined that at least one discounted price cannot be lowered (e.g. all discounted prices are set to the associated minimum prices of the corresponding products), then the process 1000 may loop back to step 1006, where another secondary product is selected in addition to or instead of the currently selected secondary product(s). Alternatively, if at decision block 1034, it is determined that at least one discounted price cannot be lowered, the process 1000 may end.

While this invention has been described in detail with particular reference to exemplary embodiments thereof, it should be understood that variations and modifications can be effected within the spirit and scope of the invention. For example, it has been described herein that a customer input signal indicating addition of a product to a virtual shopping cart may be interpreted as an expression of interest in a primary product and may trigger the assembly of a package. In an alternate embodiment, a new package may be assembled and presented to the customer each time the customer adds a new product to the virtual shopping cart. Each new package may be based on the aggregate contents of the virtual shopping cart. Furthermore, the number of products, the expected purchase total for all of the products currently in the shopping basket and/or the combined profit margin of the products currently in the shopping basket may be used to determine the depth of the discount utilized to calculate the package price. Likewise, a new package offer may be assembled and presented to the customer each time the customer removes a product from the virtual shopping cart. Again, the new packages may be based on the products remaining in the virtual shopping cart or may be based on the removed product, as an enticement to add the removed product back into the virtual shopping cart. In another alternate embodiment, the customer may be provided with an opportunity to request a package. A customer request for a package may comprise a request for the retailer to select secondary products for inclusion in a package to be offered at a retailer determined package price. As another example, a customer request for a package may comprise a request for a retailer-selected package price for a package that is assembled by the customer. In still another example, the customer may select the primary product and the secondary products for inclusion in the package as well as a suggested package price. Thus, the customer request for the package may comprise a request for retailer approval of the customer-assembled package. These and other alternate embodiments will be apparent to those of ordinary skill in the art. Accordingly, the scope of the present invention is to be limited only by the appended claims.

What is claimed is:

1. A method for determination and presentation of a package offer comprising the steps of:
    detecting, by a central server, that a primary product is of interest to a customer, the primary product having an associated primary product identifier;
    in response to detecting that the primary product is of interest to the customer, the central server dynamically determining a package on an ad hoc basis to be offered to the customer, the package comprising the primary product and at least one secondary product, the primary product and the at least one secondary product each having a corresponding retail price, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product;
    in response to determining the package, the central server determining a package price which is less than a sum of the corresponding retail prices of the primary product and the at least one secondary product; and
    presenting, by the central server, a package offer for sale of the package at the package price to the customer.

2. The method of claim 1, wherein detecting that the primary product is of interest to the customer comprises detecting that information relating to the primary product is displayed on a web-page viewed by the customer for a predetermined amount of time.

3. The method of claim 1, wherein detecting that the primary product is of interest to the customer comprises detecting an input signal generated by the customer in response to information displayed on a web-page relating to the primary product.

4. The method of claim 1, wherein detecting that the primary product is of interest to the customer comprises detecting that the customer has added the primary product to a virtual shopping cart.

5. The method of claim 1, wherein detecting that the primary product is of interest to the customer comprises:
    detecting at least one keyword input by the customer into an input field on a web-page; and
    determining that the at least one keyword relates to the primary product.

6. The method of claim 1, wherein detecting that the primary product is of interest to the customer comprises receiving a customer request for a customer requested package associated with the primary product.

7. The method of claim 1, wherein determining the package to be offered to the customer comprises accessing a database to select the at least one secondary product from a plurality of available secondary products based on at least one of the profit margin of the primary product and the profit margin of the at least one secondary product.

8. The method of claim 1, further comprising storing in a database information relating to at least one additional product of interest to the customer; and
    wherein determining the package to be offered to the customer comprises:
    accessing the database to determine the at least one additional product of interest to the customer, and
    selecting the at least one additional product of interest to the customer as the at least one secondary product.

9. The method of claim 1, further comprising storing in a database information relating to a previous transaction of the customer, the previous transaction including at least one previously sold product that does not include the primary product; and
    wherein determining the package to be offered to the customer comprises:
    accessing the database to determine the at least one previously sold product that does not include the primary product, and
    accessing the database to select the at least one secondary product from a plurality of available secondary products, the selected at least one secondary product having a predetermined relationship with the at least previously sold product that does not include the primary product.

10. The method of claim 1, wherein determining the package price comprises:
    determining a discounted price for each of the at least one secondary product; and
    summing the retail price of the primary product and the discounted price for the at least one secondary product to calculate the package price.

11. The method of claim 10, wherein the discounted price for each of the at least one secondary product is based on a profit margin of the primary product.

12. The method of claim 1, wherein determining the package price comprises:
    determining a discounted price for the each of the primary product and the at least one secondary product; and
    summing the discounted prices of the primary product and the at least one secondary product to calculate the package price.

13. The method of claim 12, wherein the discounted price for each of the primary product and the at least one secondary products is based on a profit margin of the primary product and a profit margin of the at least one secondary product.

14. The method of claim 1, further comprising:
    in response to presenting the package offer to the customer, receiving a customer response indicating a rejection of the package offer; and
    in response to the customer response, determining another package to be offered to the customer.

15. The method of claim 1, further comprising:
    in response to presenting the package offer to the customer, receiving a customer response indicating an account identifier and an acceptance of the package offer; and
    in response to the customer response, charging a financial account identified by the account identifier for the amount of the package price.

16. The method of claim 15, further comprising storing transaction data relating to sale of the package in a database.

17. The method of claim 1, wherein a first package offer for sale of a first package at a first package price is presented to the customer; and wherein a second package offer for sale of a second package at a second package price is presented to the customer.

18. The method of claim 1, wherein the package comprises the primary product and a plurality of secondary products; and
   wherein the package offer comprises an offer for sale of a pre-determined number of the secondary products, selected by the customer, at the package price.

19. The method of claim 18, wherein the package price varies based on the customer-selected number of secondary products.

20. The method of claim 1, wherein the package comprises the primary product and a plurality of secondary products; and
   wherein the package offer comprises an offer for sale of a customer-selected number of the secondary products, selected by the customer, at the package price.

21. The method of claim 1, wherein the package comprises the primary product and a plurality of lists of secondary products; and
   wherein the package offer comprises an offer for sale of a pre-determined number of the secondary products selected by the customer from each of the plurality of lists, at the package price.

22. The method of claim 1, wherein detecting that the primary product is of interest to the customer comprises receiving the primary product identifier from a customer service device at a retail establishment.

23. The method of claim 22, wherein the customer service device comprises an input device operable to input the primary product identifier and a display device operable to present the package offer.

24. The method of claim 23, wherein the customer service device further comprises a printer operable to print a printed version of the package offer.

25. The method of claim 24, wherein the printed version comprises a code identifying the package offer and product identifiers for the primary product and the at least one secondary product included in the package.

26. The method of claim 23, wherein the input device comprises a bar code reader.

27. The method of claim 1, further comprising:
   receiving from a point of sale terminal a customer response indicating an account identifier and an acceptance of the package offer; and
   in response to the customer response, authorizing the point of sale terminal to charge a financial account identified by the account identifier for the amount of the package price.

28. The method of claim 27, wherein the customer response further indicates a code identifying the package offer and product identifiers for the primary product and the at least one secondary product included in the package.

29. The method of claim 27, further comprising storing transaction data.

30. A computer-readable medium having stored thereon computer-executable instructions for performing a method comprising steps of:
   detecting that a primary product is of interest to a customer, the primary product having an associated primary product identifier;
   in response to detecting that the primary product is of interest to the customer, dynamically determining a package on an ad hoc basis to be offered to the customer, the package comprising the primary product and at least one secondary product, the primary product and the at least one secondary product each having a corresponding retail price, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product;
   in response to determining the package, determining a package price which is less than a sum of the corresponding retail prices of the primary product and the at least one secondary product; and
   presenting a package offer for sale of the package at the package price to the customer.

31. A computer-readable medium having stored thereon computer-executable instructions for performing a method comprising steps of:
   detecting that a primary product is of interest to a customer, the primary product having an associated primary product identifier;
   in response to detecting that the primary product is of interest to the customer, dynamically determining a package on an ad hoc basis to be offered to the customer, the package comprising the primary product and at least one secondary product, the primary product and the at least one secondary product each having a corresponding retail price, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product;
   in response to determining the package, determining a package price which is less than a sum of the corresponding retail prices of the primary product and the at least one secondary product; and
   presenting a package offer for sale of the package at the package price to the customer, wherein determining the package to be offered to the customer comprises accessing a database to select the at least one secondary product from a plurality of available secondary products based on at least one of the profit margin of the primary product and the profit margin of the at least one secondary product.

32. A computer-readable medium having stored thereon computer-executable instructions for performing a method comprising steps of:
   detecting that a primary product is of interest to a customer, the primary product having an associated primary product identifier;
   in response to detecting that the primary product is of interest to the customer, dynamically determining a package on an ad hoc basis to be offered to the customer, the package comprising the primary product and at least one secondary product, the primary product and the at least one secondary product each having a corresponding retail price, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product;

in response to determining the package, determining a package price which is less than a sum of the corresponding retail prices of the primary product and the at least one secondary product;

presenting a package offer for sale of the package at the package price to the customer; and storing in a database information relating to at least one additional product of interest to the customer, wherein determining the package to be offered to the customer comprises:

accessing the database to determine the at least one additional product of interest to the customer, and selecting the at least one additional product of interest to the customer as the at least one secondary product.

33. A computer-readable medium having stored thereon computer-executable instructions for performing a method comprising steps of:

detecting that a primary product is of interest to a customer, the primary product having an associated primary product identifier;

in response to detecting that the primary product is of interest to the customer, dynamically determining a package on an ad hoc basis to be offered to the customer, the package comprising the primary product and at least one secondary product, the primary product and the at least one secondary product each having a corresponding retail price, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product;

in response to determining the package, determining a package price which is less than a sum of the corresponding retail prices of the primary product and the at least one secondary product; and presenting a package offer for sale of the package at the package price to the customer; and storing in a database information relating to a previous transaction of the customer, the previous transaction including at least one previously sold product that does not include the primary product, wherein determining the package to be offered to the customer comprises:

accessing the database to determine the at least one previously sold product that does not include the primary product, and accessing the database to select the at least one secondary product from a plurality of available secondary products, the selected at least one secondary product having a predetermined relationship with the at least previously sold product that does not include the primary product.

34. A computer-readable medium having stored thereon computer-executable instructions for performing a method comprising steps of:

detecting that a primary product is of interest to a customer, the primary product having an associated primary product identifier;

in response to detecting that the primary product is of interest to the customer, dynamically determining a package on an ad hoc basis to be offered to the customer, the package comprising the primary product and at least one secondary product, the primary product and the at least one secondary product each having a corresponding retail price, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product;

in response to determining the package, determining a package price which is less than a sum of the corresponding retail prices of the primary product and the at least one secondary product;

presenting a package offer for sale of the package at the package price to the customer, wherein determining the package price comprises:

determining a discounted price for each of the at least one secondary product; and summing the retail price of the primary product and the discounted price for the at least one secondary product to calculate the package price.

35. A computer-readable medium having stored thereon computer-executable instructions for performing a method comprising steps of:

detecting that a primary product is of interest to a customer, the primary product having an associated primary product identifier;

in response to detecting that the primary product is of interest to the customer, dynamically determining a package on an ad hoc basis to be offered to the customer, the package comprising the primary product and at least one secondary product, the primary product and the at least one secondary product each having a corresponding retail price, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product;

in response to determining the package, determining a package price which is less than a sum of the corresponding retail prices of the primary product and the at least one secondary product; and presenting a package offer for sale of the package at the package price to the customer, wherein determining the package price comprises:

determining a discounted price for the each of the primary product and the at least one secondary product; and summing the discounted prices of the primary product and the at least one secondary product to calculate the package price.

36. A computer-readable medium having stored thereon computer-executable instructions for performing a method comprising steps of:

detecting that a primary product is of interest to a customer, the primary product having an associated primary product identifier;

in response to detecting that the primary product is of interest to the customer, dynamically determining a package on an ad hoc basis to be offered to the customer, the package comprising the primary product and at least one secondary product, the primary product and the at least one secondary product each having a corresponding retail price, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product;

in response to determining the package, determining a package price which is less than a sum of the corresponding retail prices of the primary product and the at least one secondary product; and presenting a package offer for sale of the package at the package price to the customer, wherein a first package offer for sale of a first package at a first package price is presented to the customer; and wherein a second package offer for sale of a second package at a second package price is presented to the customer.

37. A computer-readable medium having stored thereon computer-executable instructions for performing a method comprising steps of:

detecting that a primary product is of interest to a customer, the primary product having an associated primary product identifier;

in response to detecting that the primary product is of interest to the customer, dynamically determining a package on an ad hoc basis to be offered to the customer, the package comprising the primary product and at least one secondary product, the primary product and the at least one secondary product each having a corresponding retail price, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product;

in response to determining the package, determining a package price which is less than a sum of the corresponding retail prices of the primary product and the at least one secondary product; and presenting a package offer for sale of the package at the package price to the customer, wherein the package comprises the primary product and a plurality of secondary products; and wherein the package offer comprises an offer for sale of a pre-determined number of the secondary products, selected by the customer, at the package price.

38. A computer-readable medium having stored thereon computer-executable instructions for performing steps of:

detecting that a primary product is of interest to a customer, the primary product having an associated primary product identifier;

in response to detecting that the primary product is of interest to the customer, dynamically determining a package on an ad hoc basis to be offered to the customer, the package comprising the primary product and at least one secondary product, the primary product and the at least one secondary product each having a corresponding retail price, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product;

in response to determining the package, determining a package price which is less than a sum of the corresponding retail prices of the primary product and the at least one secondary product; and presenting a package offer for sale of the package at the package price to the customer, wherein the package comprises the primary product and a plurality of secondary products, wherein the package offer comprises an offer for sale of a pre-determined number of the secondary products, selected by the customer, at the package price, and wherein the package price varies based on the customer-selected number of secondary products.

39. A computer-readable medium having stored thereon computer-executable instructions for performing a method comprising steps of:

detecting that a primary product is of interest to a customer, the primary product having an associated primary product identifier;

in response to detecting that the primary product is of interest to the customer, dynamically determining a package on an ad hoc basis to be offered to the customer, the package comprising the primary product and at least one secondary product, the primary product and the at least one secondary product each having a corresponding retail price, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product;

in response to determining the package, determining a package price which is less than a sum of the corresponding retail prices of the primary product and the at least one secondary product; and presenting a package offer for sale of the package at the package price to the customer, wherein the package comprises the primary product and a plurality of lists of secondary products; and wherein the package offer comprises an offer for sale of a pre-determined number of the secondary products selected by the customer from each of the plurality of lists, at the package price.

40. A method for assembly, presentation and redemption of a package offer comprising the steps of:

indicating, via a customer device, an interest in a primary product;

in response to indicating an interest in the primary product, being presented at the customer device with a package offer to purchase a package at a package price, the package comprising the primary product and at least one secondary product, wherein at least one of the at least one secondary product is a product not currently selected for purchase, and further wherein at least one of the at least one secondary product is selected for inclusion in the package based on an indication of past interest, by the customer, in at least one secondary product, and further wherein the at least one secondary product does not have a pre-established relationship with the primary product; and providing, via the customer device, a customer response comprising an account identifier and an indication of an acceptance of the package offer, the acceptance of the package offer authorizing a charge to a financial account identified by the account identifier for the amount of the package offer price.

41. The method of claim 40, wherein the primary product and the at least one secondary product each have a corresponding retail price; and wherein the package price is less than the sum of the retail prices of the primary product and the at least one secondary product.

42. The method of claim 40, wherein indicating the interest in the primary product comprises viewing a web-page displaying information relating to the primary product for a pre-determined amount of time.

43. The method of claim 40, wherein indicating the interest in the primary product comprises generating an input signal in response to information displayed on a web-page relating to the primary product.

44. The method of claim 40, wherein indicating an interest in the primary product comprises adding the primary product to a virtual shopping cart.

45. The method of claim 40, wherein indicating the interest in the primary product comprises inputting at least one keyword into an input field on a web-page, the at least one keyword relating to the primary product.

46. The method of claim 40, further comprising obtaining the primary product and the at least one secondary product from the retailer after providing the customer response indicating the acceptance of the package offer.

47. The method of claim 46, wherein obtaining the primary product and the at least one secondary product from the retailer comprises visiting a retail establishment of the retailer to pick up the primary product and the at least one secondary product.

48. The method of claim 47, further comprising receiving a code from the retailer; and upon visiting the retail establishment, presenting the code to the retailer, whereby the retailer may use the code to verify that the financial account has been charged in the amount of the package price.

49. The method of claim 46, wherein obtaining the primary product and the at least one secondary products comprises receiving a shipment containing the primary product and the at least one secondary product.

50. The method of claim 40, wherein the primary product has an associated primary product identifier;

wherein indicating an interest in the primary product comprises inputting the primary product identifier into a customer service device at a retail establishment;

wherein being presented with the package offer comprises receiving the package offer from the customer service device; and wherein providing the customer response comprises presenting the account identifier, the primary product and the at least one secondary product, and the indication of the acceptance of the package offer at a point of sale terminal.

51. The method of claim 50, wherein the customer service device communicates with a central server to determine the package offer.

52. The method of claim 51, wherein the central server communicates with a database to determine the package offer, the at least one secondary product being selected from a record of available secondary products based on a profit margin of the primary product.

53. The method of claim 51, wherein the central server communicates with a database to assemble the package offer;

wherein the database stores information relating to at least one additional product in which the customer has indicated an interest; and wherein the at least one secondary product is selected based on the at least one additional products.

54. The method of claim 51, wherein the central server communicates with a database to assemble the package offer;

wherein the database stores information relating to at least one previous transaction, the previous transaction including a previously sold product; and wherein the at least one secondary product is selected based on a relationship with the previously sold product.

55. The method of claim 50, wherein the customer service device comprises an input device operable to input the primary product identifier and a display device operable to present the package offer.

56. The method of claim 55, wherein the customer service device further comprises a printer operable to print a printed presentation of the package offer.

57. The method of claim 55, wherein the input device comprises a bar code reader.

58. The method of claim 50, wherein the point of sale terminal communicates with a central server to determine the package price; and wherein the point of sale terminal communicates with a financial institution to charge the package price to the financial account.

59. The method of claim 40, wherein indicating the interest in the primary product comprises requesting a package associated with the primary product.

60. The method of claim 40, wherein the primary product and at least one secondary product are sold by a plurality of different retailers.

61. The method of claim 60, further comprising obtaining the primary product and the at least one secondary product from the plurality of different retailers by visiting each of the plurality of different retailers to pick up the primary product and the at least one secondary products.

62. The method of claim 61, further comprising receiving a code in response to providing the customer response; and upon visiting the plurality of different retailers, presenting the code to each of the plurality of different retailers, whereby each of the plurality of different retailers may use the code to verify that the financial account has been charged in the amount of the package price.

63. The method of claim 60, further comprising obtaining the primary product and the at least one secondary product from the plurality of different retailers by receiving a plurality of shipments containing the primary product and the at least one secondary product.

64. A computer-readable medium having stored thereon computer-executable instructions for performing a method comprising steps of:

indicating an interest in a primary product;

in response to indicating an interest in the primary product, being presented with a package offer to purchase a package at a package price, the package comprising the primary product and at least one secondary product, wherein at least one of the at least one secondary product is a product not currently selected for purchase, and further wherein at least one of the at least one secondary product is selected for inclusion in the package based on an indication of past interest, by the customer, in at least one secondary product, and further wherein the at least one secondary product does not have a pre-established relationship with the primary product; and providing a customer response comprising an account identifier and an indication of an acceptance of the package offer, the acceptance of the package offer authorizing a charge to a financial account identified by the account identifier for the amount of the package offer price.

65. A system for assembly, presentation and redemption of a package offer comprising:
   a processor;
   a communications port in communication with the processor operable to send and receive data;
   a database in communication with the processor operable to store information relating to products stored by corresponding product identifiers; and
   wherein the processor is operable to:
      interpret data received via the communications port from a customer device as indicating an expression of interest by a customer in a primary product;
      access the database to dynamically determine a package to be offered to the customer on an ad hoc basis, the package comprising the primary product and at least one secondary product, the primary product and the at least one secondary product each having a corresponding retail price, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product;
      determine a package price which is less than the sum of the corresponding retail prices of the primary product and the at least one secondary product; and
      present a package offer for the sale of the package at the package price to the customer.

66. The system of claim 65, wherein the data received from the customer device indicates that information relating to the primary product has been displayed on a web-page viewed by the customer for a pre-determined amount of time.

67. The system of claim 65, wherein the data received from the customer device comprises an input signal generated by the customer in response to information displayed on a web-page relating to the primary product.

68. The system of claim 65, wherein the data received from the customer device indicates that the customer has added the primary product to a virtual shopping cart.

69. The system of claim 65, wherein the data received from the customer device comprises at least one keyword input by the customer into an input field on a web-page, the at least one keyword relating to the primary product.

70. The system of claim 65, wherein the data received from the customer device comprises a customer request for a customer requested package associated with the primary product.

71. The system of claim 65, wherein accessing the database to determine the package comprises selecting the at least one secondary product from a plurality of available secondary products stored in the database based on at least one of the profit margin of the primary product and the profit margin of the at least one secondary product.

72. The system of claim 65, wherein the processor is further operable to store in a database information relating to at least one additional product of interest to the customer; and
   wherein accessing the database to determine the package comprises:
      accessing the database to determine the at least one additional product of interest to the customer, and
      selecting the at least one additional product of interest to the customer as the at least one secondary product.

73. The system of claim 65, wherein the processor is further operable to store in a database information relating to a previous transaction of the customer, the previous transaction including at least one previously sold product; and
   wherein accessing the database to determine the package comprises:
      accessing the database to determine the at least one previously sold product, and
      accessing the database to select the at least one secondary product from a plurality of available secondary products, the selected at least one secondary product having a predetermined relationship with the at least previously sold product.

74. The system of claim 65, wherein determining the package price comprises:
   determining a discounted price for each of the at least one secondary product; and
   summing the retail price of the primary product and the discounted price for the at least one secondary product to calculate the package price.

75. The system of claim 74, wherein the discounted price for each of the at least one secondary product is based on a profit margin of the primary product.

76. The system of claim 65, wherein determining the package price comprises:
   determining a discounted price for the each of the primary product and the at least one secondary product; and
   summing the discounted prices of the primary product and the at least one secondary product to calculate the package price.

77. The system of claim 76, wherein the discounted price for each of the primary product and the at least one secondary products is based on a profit margin of the primary product and a profit margin of the at least one secondary product.

78. The system of claim 65, wherein the processor is further operable to:
   receive a customer response, via the communications port, indicating a rejection of the package offer; and
   in response to the customer response, access the database to determine another package to be offered to the customer.

79. The system of claim 65, wherein the processor is further operable to:
   receive a customer response, via the communications port, indicating an account identifier and an acceptance of the package offer; and
   in response to the customer response, communicate with a financial institution via the communications port in order to charge a financial account identified by the account identifier for the amount of the package price.

80. The system of claim 79, wherein the processor is further operable to store transaction data relating to sale of the package in the database.

81. The system of claim 65, wherein a first package offer for sale of a first package at a first package price is presented to the customer; and wherein a second package offer for sale of a second package at a second package price is presented to the customer.

82. The system of claim 65, wherein the package comprises the primary product and a plurality of secondary products; and
wherein the package offer comprises an offer for sale of a pre-determined number of the secondary products, selected by the customer, at the package price.

83. The system of claim 65, wherein the package comprises the primary product and a plurality of secondary products; and
wherein the package offer comprises an offer for sale of a customer-selected number of the secondary products, selected by the customer, at the package price.

84. The system of claim 83, wherein the package price varies based on the customer-selected number of secondary products.

85. The system of claim 65, wherein the package comprises the primary product and a plurality of lists of secondary products; and
wherein the package offer comprises an offer for sale of a pre-determined number of the secondary products selected by the customer from each of the plurality of lists, at the package price.

86. The system of claim 65, wherein the customer device comprises a customer service device at a retail establishment.

87. The system of claim 86, wherein the customer service device comprises an input device operable to input the primary product identifier and a display device operable to present the package offer.

88. The system of claim 87, wherein the customer service device further comprises a printer operable to print a printed version of the package offer.

89. The system of claim 88, wherein the printed version comprises a code identifying the package offer and product identifiers for the primary product and the at least one secondary product included in the package.

90. The system of claim 87, wherein the input device comprises a bar code reader.

91. The system of claim 65, wherein the processor is further operable to:
receive from a point of sale terminal, via the communications port, a customer response indicating an account identifier and an acceptance of the package offer; and
in response to the customer response, send an authorization to the point of sale terminal, via the communications port, authorizing a charge to a financial account identified by the account identifier for the amount of the package price.

92. The system of claim 91, wherein the customer response further indicates a code identifying the package offer and product identifiers for the primary product and the at least one secondary product included in the package.

93. The system of claim 91, wherein the processor is further operable to store transaction data relating to sale of the package in the database.

94. A system for assembly, presentation and redemption of a package offer comprising:
a processor;
a display device in communication with the processor;
a communications port in communication with the processor;
an input device in communication with the processor operable to generate an input signal indicating an interest in a primary product; and
wherein the processor is operable to:
send the input signal to a central server via a communications port,
receive from the central server a package offer for purchase of a package at a package price, the package comprising the primary product and at least one secondary product, wherein at least one of the at least one secondary product is a product not currently selected for purchase by the customer, and further wherein at least one of the at least one secondary product is selected for inclusion in the package based on an indication of past interest, by the customer, in at least one secondary product, and further wherein the at least one secondary product does not have a pre-established relationship with the primary product, and
display the package offer on the display device.

95. The system of claim 94, wherein the input device is further operable to generate a customer response signal comprising an account identifier and an indication of an acceptance of the package offer, the acceptance of the package offer authorizing a charge to a financial account identified by the account identifier for the amount of the package offer price; and
wherein the processor is further operable to send the customer response to the central server via the communications port.

96. The system of claim 95, wherein the processor is further operable to receive a code via the communications port in response to sending the customer response, whereby the code may be presented to a retailer for verification that the financial account has been charged in the amount of the package price.

97. The system of claim 95, wherein the input device is further operable to generate a request for shipment of the primary product and the at least one secondary product in response to sending the customer response.

98. The system of claim 94, wherein the primary product and the at least one secondary product each have a corresponding retail price; and
wherein the package price is less than the sum of the retail prices of the primary product and the at least one secondary product.

99. The system of claim 94, wherein the input signal indicating the interest in the primary product comprises a response to information displayed on a web-page relating to the primary product.

100. The system of claim 94, wherein input signal indicating the interest in the primary product comprises a command to add the primary product to a virtual shopping cart.

101. The system of claim 94, wherein the input signal indicating the interest in the primary product comprises at least one keyword input into an input field on a web-page, the at least one keyword relating to the primary product.

102. The system of claim 94, further comprising a printer operable to print a printed version of the package offer, the printed version comprising a code identifying the package offer and product identifiers for the primary product and the at least one secondary product included in the package.

103. The system of claim 94, wherein the input signal indicating an interest in the primary product comprises a request for a package associated with the primary product.

104. The system of claim 94, wherein the primary product and at least one secondary product are sold by a plurality of different retailers.

105. A method for determination and presentation of a package offer comprising the steps of:

detecting, by a central server, that a primary product is of interest to a customer, the primary product having an associated primary product identifier;

detecting, by the central server, a loss of interest in the primary product by the customer;

in response to detecting the loss of interest in the primary product, the central server dynamically determining a package on an ad hoc basis to be offered to the customer, the package comprising the primary product and at least one secondary product, the primary product and the at least one secondary product each having a corresponding retail price;

in response to determining the package, the central server determining a package price which is less than a sum of the corresponding retail prices of the primary product and the at least one secondary product; and presenting a package offer for sale of the package at the package price to the customer.

106. The method of claim 105, wherein detecting a loss of interest in the primary product comprises:

detecting that the customer has removed the primary product from a virtual shopping basket associated with the customer.

107. The method of claim 105, wherein detecting a loss of interest in the primary product comprises:

determining that the customer has expressed interest in another product without having placed the primary product in a virtual shopping basket.

108. The method of claim 105, wherein detecting a loss of interest in the primary product comprises:

determining that the primary product has been in a virtual shopping basket associated with the customer for a predetermined amount of time without having been purchased.

109. An apparatus, comprising:

a processor, and a storage device that stores a program for directing the processor;

the processor being operative with the program to:

perform a method comprising steps of:

detecting that a primary product is of interest to a customer, the primary product having an associated primary product identifier;

detecting a loss of interest in the primary product by the customer;

in response to detecting the loss of interest in the primary product, dynamically determining a package on an ad hoc basis to be offered to the customer, the package comprising the primary product and at least one secondary product, the at least one secondary product selected based on a past interest of the customer, and the primary product and the at least one secondary product each having a corresponding retail price;

in response to determining the package, determining a package price which is less than a sum of the corresponding retail prices of the primary product and the at least one secondary product; and presenting a package offer for sale of the package at the package price to the customer.

110. A computer readable medium encoded with instructions for directing a processor to:

perform a method comprising steps of:

detecting that a primary product is of interest to a customer, the primary product having an associated primary product identifier;

detecting a loss of interest in the primary product by the customer;

in response to detecting the loss of interest in the primary product, dynamically determining a package on an ad hoc basis to be offered to the customer, the package comprising the primary product and at least one secondary product, the at least one secondary product selected based on a past interest of the customer, and the primary product and the at least one secondary product each having a corresponding retail price;

in response to determining the package, determining a package price which is less than a sum of the corresponding retail prices of the primary product and the at least one secondary product; and presenting a package offer for sale of the package at the package price to the customer.

111. A method for assembly, presentation and redemption of a package offer comprising the steps of:

indicating, by use of a customer device, an interest in a primary product;

indicating, by use of the customer device, a loss of interest in the primary product;

in response to indicating the loss of interest in the primary product, being presented at the customer device with a package offer to purchase a package at a package price, the package comprising the primary product and at least one secondary product, wherein the at least one secondary product was selected based on a past interest; and providing a customer response via the customer device comprising an account identifier and an indication of an acceptance of the package offer, the acceptance of the package offer authorizing a charge to a financial account identified by the account identifier for the amount of the package offer price.

112. A system for assembly, presentation and redemption of a package offer comprising:

a processor;

a communications port in communication with the processor operable to send and receive data;

a database in communication with the processor operable to store information relating to products stored by corresponding product identifiers; and wherein the processor is operable to:

interpret data received via the communications port from a customer device as indicating an expression of interest by a customer in a primary product;

interpret data received via the communication port from a customer device as indicating a loss of interest by the customer in the primary product;

in response to the data indicating the loss of interest, access the database to dynamically determine a package on an ad hoc basis to be offered to the customer, the package comprising the primary product and at least one secondary product, the primary product and the at least one secondary product each having a corresponding retail price, wherein the at least one secondary product was selected based on a past interest of the customer;

determine a package price which is less than the sum of the corresponding retail prices of the primary product and the at least one secondary product; and present a package offer for the sale of the package at the package price to the customer.

* * * * *